US010324583B2

(12) United States Patent
Jiang

(10) Patent No.: US 10,324,583 B2
(45) Date of Patent: Jun. 18, 2019

(54) MOBILE OPERATING SYSTEM

(71) Applicant: Hongming Jiang, Zhejiang (CN)

(72) Inventor: Hongming Jiang, Zhejiang (CN)

( * ) Notice: Subject to any disclaimer, the term of this patent is extended or adjusted under 35 U.S.C. 154(b) by 418 days.

(21) Appl. No.: 14/901,937

(22) PCT Filed: Jun. 27, 2014

(86) PCT No.: PCT/CN2014/080955
§ 371 (c)(1),
(2) Date: Nov. 21, 2016

(87) PCT Pub. No.: WO2015/000382
PCT Pub. Date: Jan. 8, 2015

(65) Prior Publication Data
US 2017/0109011 A1 Apr. 20, 2017

(30) Foreign Application Priority Data
Jul. 2, 2013 (CN) .......................... 2013 1 0279869

(51) Int. Cl.
*H04M 1/725* (2006.01)
*G06F 3/0481* (2013.01)
(Continued)

(52) U.S. Cl.
CPC ........ *G06F 3/04817* (2013.01); *G06F 1/1694* (2013.01); *G06F 3/017* (2013.01);
(Continued)

(58) Field of Classification Search
CPC combination set(s) only.
See application file for complete search history.

(56) References Cited

U.S. PATENT DOCUMENTS 8,000,689 B2 * 8/2011 Featherstone ........... H04W 4/02
455/414.1
9,575,589 B2 * 2/2017 Jeon ...................... G06F 3/0488
(Continued)

FOREIGN PATENT DOCUMENTS

| CN | 102799351 A | 11/2012 | ............. G06F 3/048 |
| CN | 103176714 A | 6/2013 | ........... G06F 3/0484 |

(Continued)

OTHER PUBLICATIONS

International Search Report issued in application No. PCT/CN2014/080955, dated Sep. 26, 2014 (5 pgs).
(Continued)

*Primary Examiner* — Hien L Duong
(74) *Attorney, Agent, or Firm* — Hayes Soloway P.C.

(57) ABSTRACT

A mobile operating system, includes a "Smart Dynamic Icon", a "Quick Voice Assistant", a "Quick Slide Assistant", "Smart Gesture", a "Full Screen Application Interface", a "Global Application Icons Interface", "Quick Shut Down" and an "Important Contacts Application". If an application is in an update status, the "Smart Dynamic Icon" automatically display this application's icon on a home screen. The "Quick Voice Assistant" directly starts an application with the voice, don't need access to the network. The "Quick Slide Assistant" directly start an application, by sliding a specific slide path on the home screen. The "Smart Gesture" directly starts an application, according to a user gesture. In addition, when an user takes a mobile phone from a pocket, with "Smart Gesture" the system automatically wakes-up, or the system automatically wakes-up and automatically slides unlock at the same time.

10 Claims, 12 Drawing Sheets

(51) Int. Cl.
*G06F 1/16* (2006.01)
*G06F 3/0488* (2013.01)
*G06F 9/451* (2018.01)
*G06F 3/01* (2006.01)
*G06F 3/0346* (2013.01)
*G06F 3/0482* (2013.01)
*G06F 3/16* (2006.01)
*G10L 15/22* (2006.01)

(52) U.S. Cl.
CPC ......... *G06F 3/0346* (2013.01); *G06F 3/0482* (2013.01); *G06F 3/04883* (2013.01); *G06F 3/167* (2013.01); *G06F 9/453* (2018.02); *G10L 15/22* (2013.01); *H04M 1/72583* (2013.01)

(56) References Cited

U.S. PATENT DOCUMENTS

| | | | |
|---|---|---|---|
| 9,692,873 B2* | 6/2017 | Yoon | H04M 1/72566 |
| 10,115,370 B2* | 10/2018 | Min | G09G 5/006 |
| 2007/0037610 A1 | 2/2007 | Logan | 445/574 |
| 2008/0122796 A1* | 5/2008 | Jobs | G06F 3/0488 345/173 |
| 2008/0165153 A1* | 7/2008 | Platzer | G06F 1/1626 345/173 |
| 2009/0100384 A1* | 4/2009 | Louch | G06F 1/1626 715/863 |
| 2009/0267780 A1 | 10/2009 | Van Hoff et al. | 340/635 |
| 2009/0307616 A1* | 12/2009 | Nielsen | H04M 1/72566 715/764 |
| 2010/0105370 A1 | 4/2010 | Kruzeniski et al. | 455/414.3 |
| 2010/0122167 A1 | 5/2010 | Ryu | 715/716 |
| 2010/0146444 A1* | 6/2010 | Wang | G06F 3/017 715/815 |
| 2010/0160014 A1 | 6/2010 | Galasso et al. | 463/6 |
| 2010/0312547 A1* | 12/2010 | Van Os | G10L 15/26 704/9 |
| 2010/0317371 A1* | 12/2010 | Westerinen | H04M 1/72566 455/456.6 |
| 2010/0329642 A1 | 12/2010 | Kam et al. | 386/280 |
| 2011/0047510 A1* | 2/2011 | Yoon | H04M 1/72566 715/835 |
| 2011/0057953 A1 | 3/2011 | Horodezky | 345/647 |
| 2012/0042036 A1 | 2/2012 | Lau et al. | 709/217 |
| 2012/0050161 A1 | 3/2012 | Andersson et al. | 345/158 |
| 2012/0200607 A1 | 8/2012 | Ross et al. | 345/676 |
| 2012/0221966 A1 | 8/2012 | Inami et al. | 715/761 |
| 2013/0014040 A1 | 1/2013 | Jagannathan et al. | 715/765 |
| 2013/0035942 A1 | 2/2013 | Kim et al. | 704/275 |
| 2013/0063369 A1 | 3/2013 | Malhotra et al. | 345/173 |
| 2013/0085755 A1 | 4/2013 | Bringert et al. | 704/235 |
| 2013/0150117 A1 | 6/2013 | Rodriguez et al. | 455/550.1 |
| 2013/0283199 A1 | 10/2013 | Selig et al. | 715/781 |
| 2016/0034167 A1* | 2/2016 | Wilson | G06F 3/04845 715/771 |

FOREIGN PATENT DOCUMENTS

| | | | |
|---|---|---|---|
| CN | 103309618 A | 9/2013 | ........... G06F 3/0488 |
| EP | 2 317 744 | 5/2011 | ............. H04M 1/73 |
| EP | 2 575 128 | 4/2013 | ............ G10L 15/26 |
| GB | 2486707 | 6/2012 | ............. G06F 3/048 |
| JP | 2010-15238 | 1/2010 | ............. G06F 3/041 |
| JP | 2011-209863 | 10/2011 | ............. G06F 3/048 |
| JP | 2012-133787 | 7/2012 | ............. G06F 21/20 |
| JP | 2012-174217 | 9/2012 | ............. G06F 9/445 |
| JP | 2012-205077 | 10/2012 | ............. H04M 1/73 |
| JP | 2013-41580 | 2/2013 | ............. G06F 3/048 |
| JP | 2013-504135 | 2/2013 | ........... G06F 3/0488 |
| WO | WO 2012/078079 | 6/2012 | |
| WO | WO 2012/083277 | 6/2012 | ............... G06F 3/01 |
| WO | WO 2013/021539 | 2/2013 | ............... G09G 5/36 |

OTHER PUBLICATIONS

Written Opinion of the International Searching Authority (with translation) issued in application No. PCT/CN2014/080955, dated Sep. 26, 2014 (10 pgs).
International Preliminary Report on Patentability issued in application No. PCT/CN2014/080955, dated Sep. 26, 2014 (12 pgs).
"Utter!" (https://play.google.com/store/apps/details?id=com.brandall.nutter&hl=en) released in 2012, 3 pages, found by way of Web Archive, https://archive.org/web/.
"SwipePad" (https://play.google.com/store/apps/details?id=mobi.conduction.swipepad.android) released 2011, found by way of Web Archive, https://archive.org/web/.

* cited by examiner

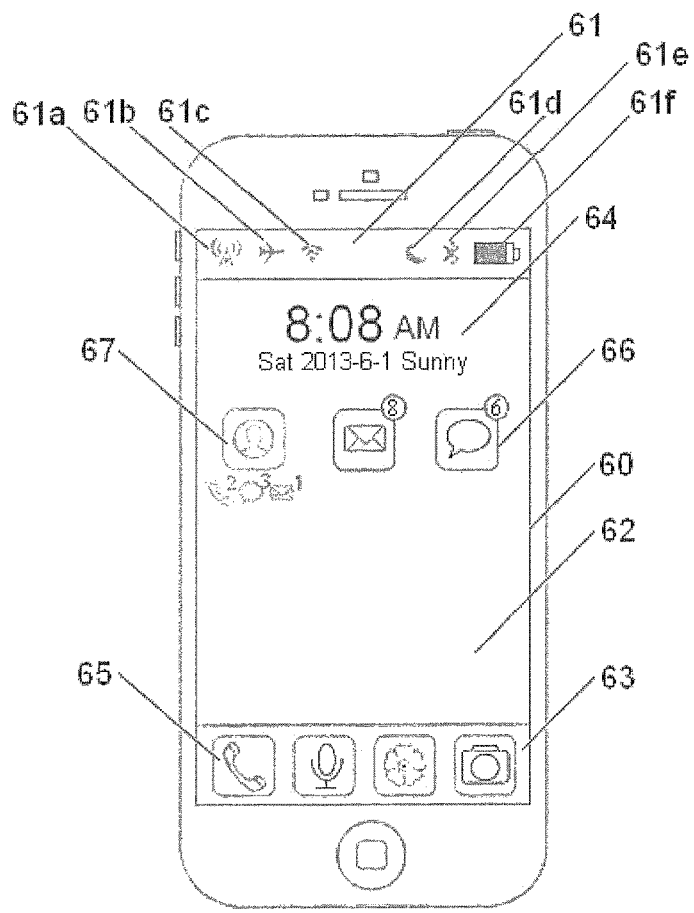
FIG.13
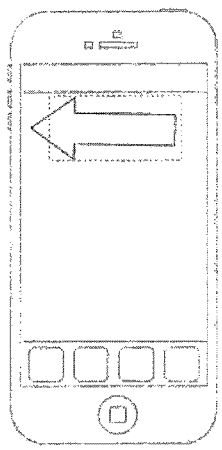 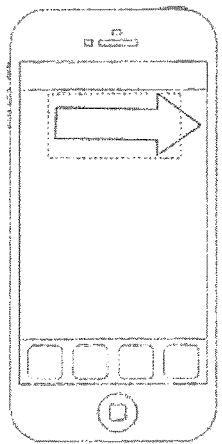 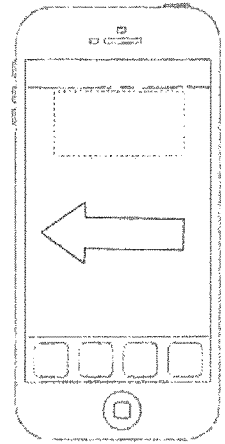 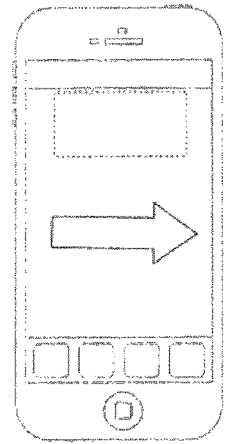
FIG.14     FIG.15     FIG.16     FIG.17

  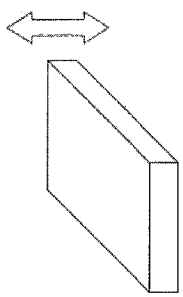 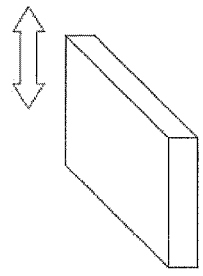
FIG.53　　　FIG.54　　　FIG.55　　　FIG.56
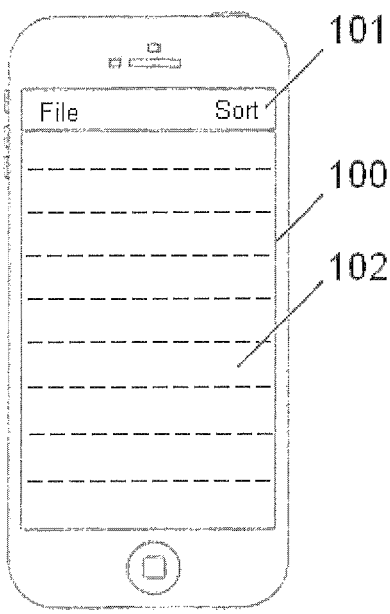
FIG.57
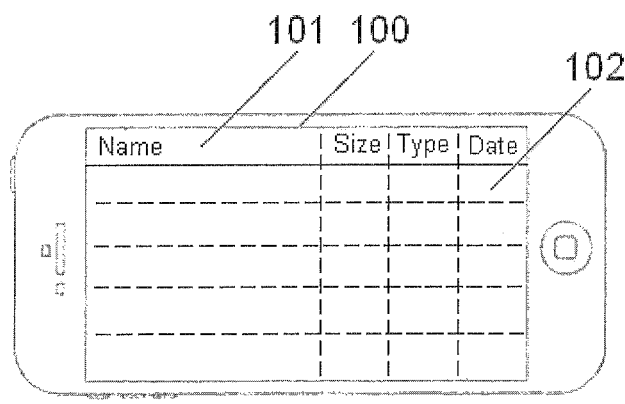
FIG.58

MOBILE OPERATING SYSTEM

TECHNICAL FIELD

The present invention belongs to the field of mobile operating systems.

BACKGROUND

In 2007, Apple® released iPhone® and iOS®, creating a static icon operate age of mobile operating systems.

First of all, whether iOS®, or Google®'s Android®, or other present mobile operating systems, these kinds of static icon operating methods, all follow from Steve jobs, and present no revolutionary change. In these kinds of static icon operating method: one needs to slide the desktop page by page, or to open folder by folder, searching an icon and application name, then clicking on an icon to open an application, thus the operating efficiency is very low. And the low efficiency also affects battery time.

Secondly, the most difficult challenge currently of mobile devices is battery time. The iOS® and Android®'s application multi-tasking method is one important reason of that the battery time of mobile devices cannot be longer.

Finally, traditional static icons limit the display and expression on the small screens of mobile devices. Traditional static icons cannot provide more intuitive, more interesting, and more beautiful Human-Machine Interface.

Additionally, traditional desktop operating systems, such as Apple®'s OS X® and Microsoft®'s Windows®, only have two open application methods. One method is to use a screen cursor control device (such as a Mouse, Touchpad, etc), to click or double-click the application's icon; the other method is to click or double-click the application's name in the menu.

Mobile operating systems such as iOS®, Android®, and so on, normally only have two open application methods. One method is to use finger touch or pen click the touchscreen of mobile devices, to click the application's icon to open the application; another method is to click the application's notification message to open the application.

Whether in mobile operating systems such as iOS® and Android®, or in desktop operating systems such as OS X® and Windows®, an application icon's position on the desktop or the menu, is fixed. A user can move, configure and change the application icon's position, but after user configuration, the position is still stationary. Before the present invention, all operating systems involved static icon technology. The present invention provides smart dynamic icon technology. An application icon's position on the desktop or the menu changes in real-time, intelligently and automatically appears when a user needs to use the application, and intelligently and automatically disappears when a user does not need the application. This technology saves screen space, especially on mobile devices, which configures small screen. The present invention allows operating systems to enter the "Smart Dynamic Icon Age", from "Static Icon Age".

Whether in mobile operating systems, such as iOS® and Android®, or in desktop operating systems such as OS X® and Windows®, to open application, one only clicks or double-clicks the application's icon or the application's name.

The present invention can open an application, through detecting device movement in the three-dimensional space. The present invention allows the operating systems to enter the "Smart Gesture Age", from the "Icon Age".

A mobile operating system, such as iOS® and Android®, provides voice command features to open an application, but Siri® and Google Now® must be connected to a network, and error rate is high.

The present invention can use voice command to open an application without being connected to a network, and the accuracy rate is very high.

The "Smart Gesture" and the "Quick Voice Assistant" of the present invention, allows operating systems to enter the "Post Icon Age".

SUMMARY

To solve the deficiency of the above prior art, the present invention proposes a mobile operating system.

A mobile operating system provides:

A system for detecting an application of a different status, if the application status fits the system and user setting, it automatically displays the icon of the application on a home screen; if the application status does not fit the system and user setting, the application icon is automatically removed from the home screen.

A system for detecting device movement of a variable value in the three-dimensional space, through sensors in the device; a system for detecting device environment variable value, through sensors in the device; a system for detecting device power supply status, through a circuit in the device. A system for calculating a device use situation of a user, based on combining the device movement variable value, the device environment variable value, and the device power supply status. Wherein the system executes setting operations if the calculated device use situation fits the system and the user setting, wherein the setting operations comprise automatic wake-up, auto unlock, auto sleep, shutdown, power on, a direct opening system and user setting applications, closing current running applications, automatic displaying category application icons on the home screen, and so on.

A system for providing an input for the voice of a user, to speak a name of an application through a microphone in the device; the system compare the spoken name with an 'application name voice library', which includes all user installed application name voices; then the system directly opens the corresponding application which compared result is fit with the user voice.

A system for detecting the slide path of one or more fingers of the user on a touchscreen, the system directly opens the system and user setting, and the unique application corresponds to the slide path.

The mobile operating system comprises an "Application Management Unit", a "Device Movement Detection Unit", a "Device Environment Detection Unit", a "Device Power Supply Detection Unit", a "User Use Mode Analyzing Unit", a "Graphical User Interface", a "Quick Voice Assistant", and a "Quick Slide Assistant".

The above-mentioned mobile operating system, comprises a "Smart Dynamic Icon"; an "Application Management Unit", the "Application Management Unit" comprising an "Application Status Detection Unit", an "Application Icon Management Unit", an "Application Opening Unit", an "Application Install and Delete Unit".

The "Application Management Unit" detects all application statuses through the "Application Status Detection Unit", the detected application status is in an "Update Status" or a "Non-Update Status". When the "Application Status Detection Unit" detects the application status is in the "Update Status", the "Application Icon Management Unit" automatically displays this application's icon on the home screen.

The "Application Icon Management Unit" manages all application icons, manages whether the application icons are displayed or not displayed, on which desktop they are displayed, the display position on the desktop, the display size, the display time, the display form, and the display sound.

When the user clicks this application's icon, the "Application Opening Unit" opens and runs this application.

When the "Application Status Detection Unit" detects the application on the home screen, the status is in the "Non-Update Status", and the "Application Icon Management Unit" automatically removes that application's icon from the home screen.

When the user slides left or slides right from the "Update Status" application icon, ignores the update status, or clicks the home button to ignore the update status, the "Application Icon Management Unit" removes the application icon from the home screen.

When the user slides downwards or slide upwards from the "Update Status" application icon, the updated content is directly read.

Or when the "Application Status Detection Unit" detects the application, the status is in the "Update Status", and the update content is automatically displayed on the home screen; the update content automatically disappears after a set time; or disappears after the user clicks and reads it; or disappears when sliding left or sliding right from the update content.

Each user individually customizes the system for each application: if the application icon is automatically displayed on the home screen, when this application status is in the "Update Status"; if the application icon is always displayed on the home screen; if the application icon is automatically displayed on the home screen, for the different update content types, for the different updated content source, and for different update content objects of the "Update Status".

The above-mentioned mobile operating system, comprises a "Quick Slide Assistant".

The"Quick Slide Assistant" comprising a "User Touch Path Identification Unit", and a "User Touch Path Mode Library".

The "User Touch Path Identification Unit" detects and identifies the user touch path and slide path on the touchscreen through a touch sensor.

The "User Touch Path Mode Library" comprises a series of specific touch and slide path modes. The "User Touch Path Mode Library" comprises a single finger or multi-finger click or double-click; single finger or multi-finger slide straight line, arc line, broken line, circle, triangle, rectangle, symbol; the symbol comprising letter symbols, character symbols, number symbols, mathematical symbols.

When the "User Touch Path Identification Unit" detects and identifies a user touch and slide path on the touchscreen, compares this touch and slide path with a "User Touch Path Mode Library", it directly opens this touch and slide path corresponding application through the "Application Opening Unit".

The same slide path can pass different display content on the screen corresponding to open different applications. The same slide path having a starting point on a different application icon can correspond to opening different applications. The same slide path using a different number of fingers, or placing the fingers together or apart can correspond to opening different applications.

The above-mentioned mobile operating system comprises a "Quick Voice Assistant".

The "Quick Voice Assistant" comprising a voice input unit, an application name voice library, a voice compare unit, and a voice text conversion unit.

The voice input unit provides for inputting a voice through a microphone, recording the user's spoken voice of application name, and using the voice compare unit to compare this recording voice with the application name voice library, then direct opening the application.

For the application name voice library, each time a user installs a new application, this application name's voice is downloaded from a server; or all user installed application name voices are downloaded from a server at one time.

For the application name voice library, when a user uninstalls an application, the system deletes this application name voice from the application name voice library.

Or, the application name voice library, through voice text conversion unit, converts all user installed application name texts to voices.

A user can long press at a blank area on the home screen, to start the "Quick Voice Assistant". The user can long press at a desktop background, at the press place which does not have an icon; then the "Quick Voice Assistant" promptly appears, the user speaks an application' name voice towards the microphone, this application directly opens after the user removes his finger.

The above-mentioned mobile operating system, comprising a "Smart Gesture".

The "Smart Gesture" comprises the "Device Movement Detection Unit", the "Device Environment Detection Unit", the "Device Power Supply Detection Unit", the "User Use Mode Analyzing Unit".

The "Device Movement Detection Unit" detects the device's movement variable value in the three-dimensional space, the movement variable value comprising displacement, angular velocity, speed, acceleration, rotation vector, height, and slope angle.

The "Device Environment Detection Unit" detects the device's surrounding environment variable value, the environment variable value comprising light, temperature, humidity, sound, geography location, gravity, local time, heart rate, sweat, blood pressure, blood sugar, electrocardiogram, electromyography, brain waves, and face recognition.

The "Device Power Supply Detection Unit" detects the device's power supply status, the device's power supply status comprising adapter power supply, internal battery power supply, external battery power supply, battery charging, shutdown, power on, hibernation, sleep, stand by, wake up, supply voltage, and supply current.

The "User Use Mode" comprises the modes of: a hand held device portrait direction, a hand held device landscape direction, a device placed horizontally on an object, a device in a vertical position (raising), a device placed in a pocket or bag. The "User Use Mode" comprises these five modes and switches between these five modes.

The "User Use Mode Analyzing Unit" calculates three variable values: the device movement variable value in the three-dimensional space, the device surrounding environment variable value, and the device power supply status, and then analyzes the user use mode to determine the user use mode or any switching between the five modes.

The system calculates the "User Use Mode" through the "User Use Mode Analyzing Unit", then the system executes an operation corresponding to the calculated "User Use Mode", the system and the user set up each "User Use Mode" corresponding operation.

In the above-mentioned mobile operating system:

If the system detects a device height variable value with a changing value of zero, a tri-axial angle variable value with a changing value of zero, and a power supply status that is 'sleep' or 'shutdown', then the "User Use Mode Analyzing Unit" analyzes that the "User Use Mode" of the device is 'device placed horizontally on an object'.

If the system detects a device height variable value with a changing value that is less than a set value, a tri-axial angle variable value with a changing value that is greater than zero and less than a set value, a device surrounding light variable value that is less than a set value, and a power supply status that is 'sleep' or 'shutdown', then the "User Use Mode Analyzing Unit" analyzes that the "User Use Mode" is 'device placed in a pocket or bag'.

If the system detects that the angle between the device screen and the horizontal plane, is between two set values; that the angle between device portrait direction (length direction) and the horizontal plane is greater than a set value, and that the power supply status is in the 'unlock' status, then the "User Use Mode Analyzing Unit" analyzes that the "User Use Mode" is 'device in hand held portrait direction'.

If the system detects that the angle between the device screen and the horizontal plane is between two set values, that the angle between the device landscape direction (width direction) and the horizontal plane is greater than a set value, and that the power supply status is in the 'unlock' status, then the "User Use Mode Analyzing Unit" analyzes that the "User Use Mode" is 'device in hand held landscape direction'.

If the system detects that the angle between the device screen and the horizontal plane is greater than a set value, and that the power supply status is in the 'unlock' status, then the "User Use Mode Analyzing Unit" analyzes that the "User Use Mode" is 'device in a vertical (holding) position'.

If the system detects a device height variable value with a changing value that is greater than a set value and at the same time, the device surrounding light variable value is changing to 'brightening', and the changing value is greater than a set value, the system will automatically wake-up, or the system will automatically wake-up together with an automatic unlock slide at the same time.

If the system detects a device height variable value with a changing value that is greater than a set value and at the same time, the device surrounding light variable value is changing to 'darkening', and the changing value is greater than a set value, the system will automatically sleep.

If the system detects a device height variable value with a changing value that is greater than a set value, and at the same time, the angle between device screen and the horizontal plane is greater than a set value, the system will automatically open a camera application.

If the system detects a "User Use Mode" from 'device in hand held portrait direction' or 'device in hand held landscape direction', to 'device placed horizontally on an object', the system will automatic sleep.

If the system detects a "User Use Mode" from 'device placed horizontally on an object' to 'device in hand held portrait direction' or 'device in hand held landscape direction', the system will automatically wake-up, or the system will automatically wake-up together with an automatic unlock slide at the same time.

If the system detects a "User Use Mode" from 'device in hand held portrait direction' to 'device in hand held landscape direction', the system automatically opens a video application, or displays all installed video class application icons on the home screen.

In the above-mentioned mobile operating system:

When the "User Use Mode" is 'device placed horizontally on an object', and the system detects the device shaking left and right, or forward and backward; the system will automatically wake-up.

When the "User Use Mode" is 'device in hand held portrait direction', and the system detects the device shaking left and right, or up and down, or forward and backward, the system will directly open a corresponding instant messaging (IM) application which is setup by the system and user.

The system opens different applications according to different movement amplitudes, different movement speeds, different movement strengths, and different number of times of movement.

For the same gesture, the system opens different applications according to different local times, and different locations.

At night, after a set time, and overturning the phone and screen downward, the system automatically shut downs. In the morning, after a set time, and overturning phone and screen upward, the system automatically turns power on. Between two set times, overturning the phone and screen downwards, is a mute function or closing application function.

When on the home screen and the system detects headphones inserted into the headphone jack, the system automatically opens a music application or displays music class application icons on the home screen.

In the above-mentioned mobile operating system:

The "Graphical User Interface" comprises the "Home Screen", a "Global Application Icons Interface", a "Full Screen Application Interface", a "File Browser Interface", and a "Multi-Task Interface".

The "Home Screen" comprises three sections: a status bar on the top of the home screen, a dock bar at the bottom of the home screen, a desktop in the middle of the home screen, the desktop has a real-time information display area.

The user may click with two fingers or multiple fingers on the real-time information area to open the 'clock' application.

The user may click with one finger or long press the instruction icons on the status bar, to directly setup these instruction features. The user may click the status bar with multiple fingers to open the 'settings' application.

A communication signal indication icon on the status bar has different color and different flashings to illustrate the strength of the communication signal; a green or blue display illustrate that the signal is strong, a yellow or yellow flashing display illustrate that the signal is ordinary, a red or red flashing display illustrate that the signal is weak.

A "Full Screen Application Interface" owns all the display area of the entire screen, there is no fixed status bar on the top of screen.

The "Global Application Icons Interface" comprises three sections: a search bar on the top of the screen, an application icons display area in the middle of screen, a dock bar at the bottom of screen; there is a trash basket icon on the dock bar. The application icons display area shows all application icons except the applications on the dock bar.

The "Global Application Icons Interface" automatically adjusts the display size of the application icons according to the quantity of user installed applications.

The "Global Application Icons Interface" arranges application icons according to user use frequency, or arranges application icons according to user open time, or arranged applications icons by application type.

The "Global Application Icons Interface" displays different application icons in different sizes according to user use frequency, user open time, and application type.

For the "Global Application Icons Interface", a one finger double-click zooms in and zooms out the display icon; separating or moving together two fingers zooms in and zooms out the display icon.

In the "Global Application Icons Interface", when dragging an application icon to the trash basket icon, the system uninstalls this application, and long pressing the trash basket icon is choosing to recover and re-install the deleted applications.

In the "Global Application Icons Interface", if an application does not open over a set time, the system auto-reminds the user whether or not to delete this application.

The "File Browser Interface" comprises a menu bar on the top of screen, and a file display area below the menu bar. The menu bar arranges files according to file name, file size, file type, and file date. On the file display area, the user may click to open a file, slide left or right to delete a file, and long press to rename a file name.

The "Multi-Task Interface" comprises a menu bar on the top of the screen, and a running applications display area below the menu bar. Running applications display area shows running application cards. The menu bar comprises a CPU item, a Memory item and a Battery item.

On any interface, one may use three or more fingers to click or double-click, to open the "Multi-Task Interface". Or, on any interface, one may use three or more fingers together to slide on the screen to open the "Multi-Task Interface".

In the above-mentioned mobile operating system comprising a direct complete close application function:

In an application's interface, using one or more fingers, sliding from down to up from the bottom of the screen, or sliding from up to down from the top of the screen, directly completely closes this application.

Alternatively, in an application's interface, sliding to tune out the system menu bar, there is a virtual close button on the menu bar, clicking the virtual close button directly and completely closes this application.

Also, in an application's interface, long pressing the home button directly and completely closes this application.

Or in an application's interface, clicking the power button directly and completely closes this application.

Or in an application's interface, when the system detects the device is rotating the screen down, and the angle between the screen and horizontal plane being less than a set number, the system directly and completely closes this application.

In an interface of the application, double-clicking the home button directly opens the application that was running before, thereby fast switching between applications.

Pressing the home button and volume button at the same time adjusts screen brightness.

The above-mentioned mobile operating system comprises an important contacts application, integrating all the information of important contacts of a user in one place. The head portrait of the important contacts of the user is the icon of the important contacts application. Clicking the icon of the important contact application, displays all sub-options related to the important contacts.

The important contacts application can also combine with the background photo of desktop, after the user sets an important contact's photo as a background photo of the desktop, the user can click on the background photo with one or more fingers, to directly open sub-options, or slide along a specific path on the background photo, to directly open specific features related to the important contacts in the background photo. Specific features comprises making a phone call, sending a message, leaving a voice message, video calling, and so on. The user subscription of important contacts in social networking provides for important contacts to update status to automatically display on the background photo.

Compared with the prior art, the present invention has the following advantages:

1. Application average opening speed is more than twice the speed of iOS® and Android®.

2. At the same device configuration and same use situation, the device battery time is 130% of iOS® and Android®, even 1.5 times to 2 times of iOS® and Android®.

3. No need lock screen. The home screen of the present invention, is equal to iOS® and Android®'s lock screen, iOS® and Android®'s home screen, iOS® and Android®'s Notification Center Interface, and iOS® and Android®'s Control Center Interface added together. The home screen of the present invention integrates the above four interfaces of iOS® and Android® to one single interface, and this integrated home screen is more spacious, more clean, and more beautiful.

4. Screen real display area is 5%-13% bigger than iOS® and Android®.

5. Operation is more natural, intuitive; user experience is better than Apple®'s iOS®.

BRIEF DESCRIPTION OF THE DRAWINGS

For the skilled person in the field, the following detailed description of drawings can provide a clearer understanding of present invention, the abovementioned advantages will become more apparent, and including:

FIG. 13: Home screen sample of the present invention operating system

FIG. 14: Slide from right to left on the time display area of the home screen.

FIG. 15: Slide from left to right on the time display area of the home screen.

FIG. 16: Slide from right to left on the background desktop of the home screen.

FIG. 17: Slide from left to right on the background desktop of the home screen.

FIG. 53: Vertical and Sideways hold mobile phone, left and right shaking.

FIG. 54: Vertical and Sideways hold mobile phone, front and behind shaking.

FIG. 55: Horizontal and Sideways hold mobile phone, left and right shaking.

FIG. 56: Horizontal and Sideways hold mobile phone, up and down shaking.

FIG. 57: File browser interface of the present invention operating system.

FIG. 58: File browser interface of the present invention operating system.

BRIEF DESCRIPTION OF SYMBOLS

Figure 1:
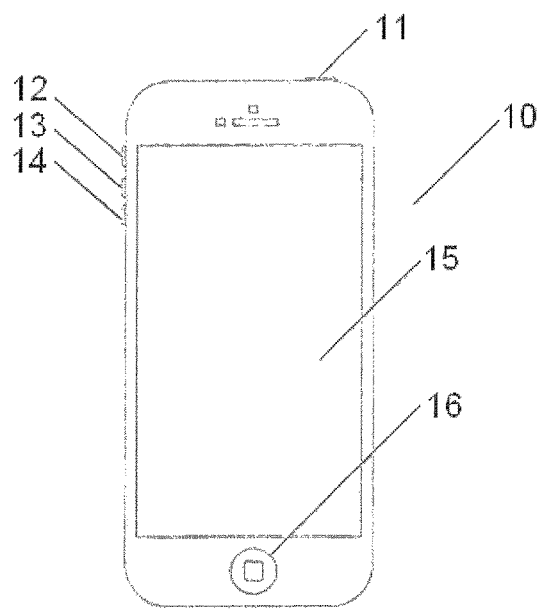
FIG. 1: Schematic diagram of phone components.

10: Mobile phone 11: Power/Sleep button
12: Mute key/Lock Screen keys 13: Volume button
14: Volume button 15: Screen
16: Home button
20: Home screen of iOS 21: Status bar
22: Desktop 23: Dock bar
24: Desktop Instruction 25: Application icon
26: Application icon
30: Home screen of Android 31: Status bar
32: Search bar 33: Upper half desktop
34: Lower half desktop 35: Dock bar
36: Menu Bar 37: Desktop Instruction
38: Application icon 39: Application icon
40: iOS and Android's application interface
41: Fixed status bar 42: Application display area
43: iOS's status bar sample
50: Full Screen Application Interface
51: Full Screen Application Interface display area
60: Home screen of the present invention operating system
61: Status bar 62: Desktop
63: Dock bar 64: Time display area
65: Application icon
66: Application which status is "Update Status"
67: Important contacts application
68: Important contacts application sub-options bar
69: Important contacts application sub-options
61a: Communication signal Indicator 61b: Flight Status Indicator
61c: WiFi Status Indicator 61d: Anti-interference Indicator
61e: Bluetooth status Indicator 61f: Battery status Indicator
70: iOS's search interface 71: Search bar
72: Blank area 73: Keyboard area
80: "Global Application Icons Interface" of the present invention operating system
81: Search bar 82: Application icon display area
83: Dock bar 84: Application icon
85: Zoom out display application icon
86: Zoom in display high use frequency application icons
87: Trash basket
90: Notes application interface of the present invention.
91: Text area 92: Keyboard area
93: Cursor 94: Application icon
95: Application icon 96: Application icon
97: Application icon
100: File browser interface of the present invention
101: File Menu Bar 102: File display area 120: Multi-task interface of the present invention
121: Multi-task Menu Bar 122: Multi-task area
123: Running application

DETAILED DESCRIPTION

The present invention operating system comprises traditional Core OS, Core Services, Media and Touch UI. The Core OS comprises Device drivers, Processing management, Memory management, File system, Security, Power Management, and so on. The Core Services comprises Networking, Core Location, Address Book, API, and so on. The Media comprises Audio, Video, OpenAL, OpenGL, 2D, 3D, and so on. The Touch UI comprising Multi-Touch, and so on.

The present invention operating system, special comprises "Application Management Unit", "Device Move Management Unit", "Device Environment Detection Unit", "Graphical User Interface", "Quick Voice Assistant", and "Quick Slide Assistant".

The "Application Management Unit" comprises "Application Status Detection Unit", "Application Icon Management Unit", "Application Opening Unit", "Application Install and Delete Unit".

The "Device Move Management Unit" comprises "Device Movement Detection Unit", "Device Move Mode Library", "User Use Mode Analyzing Unit".

The "Graphical User Interface" comprises "Home screen", "Global Application Icons Interface", "Full Screen Application Interface", "File Browser Interface", "Multi-task interface".

The system detects device movement variable value in the three-dimensional space, through sensors in the device. The system detects device surrounding environment variable value, through sensors in the device. The system detects device power supply status through circuitry in the device. Then the system calculates a user use device situation based on the combination of the device movement variable value, the device environment variable value, and the device power supply status. The system executes set operations, if the calculated user use device situation fits the system and user setting. Set operations comprises automatic wake-up, auto unlock, auto sleep, shutdown, power on, directly open system and user setting application, close current running application, automatic display of a category application icons on home screen, and so on.

Environment variable value includes, but is not limited to light, temperature, humidity, sound, geography location, gravity, local time, heart rate, sweat, blood pressure, blood sugar, electrocardiogram, electromyography, brain waves, face recognition.

Device power supply status includes, but is not limited to adapter power supply, internal battery power supply, external battery power supply, battery charging, shutdown, power on, hibernation, sleep, stand by, wake up, supply voltage, supply current.

As shown in FIG. 1, Mobile Phone 10 generally consists of the following components: Power/Sleep button 11, Mute key/Lock Screen keys 12, Volume button 13, Volume button 14, Screen 15, Home button 16. Different phones may differ, For example, some phones do not have physical Home button 16. Mobile Phone 10 has a circuit inside.

Figure 2:
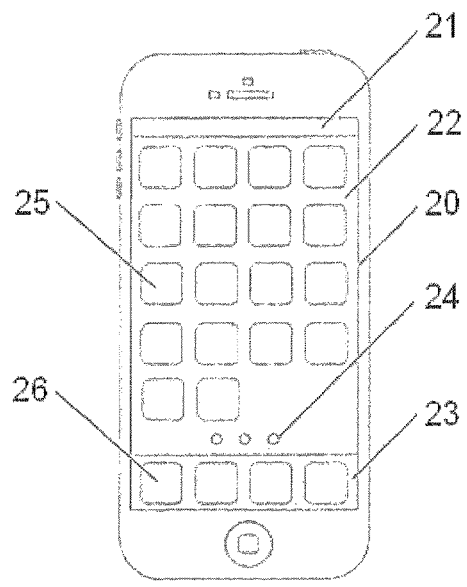
FIG. 2: Schematic diagram of iOS® home screen.
Figure 4:
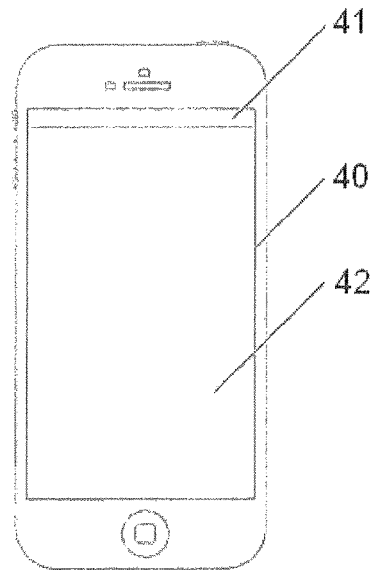
FIG. 4: iOS® and Android®'s application interface have fixed status bar.
Figure 5:
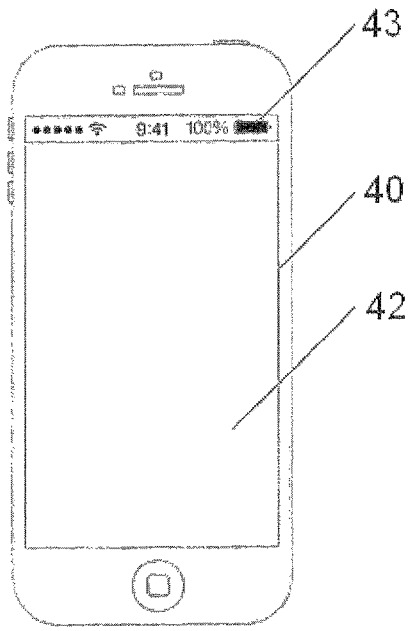
FIG. 5: Fixed status bar sample of iOS® and Android®'s application interface.
Figure 6:
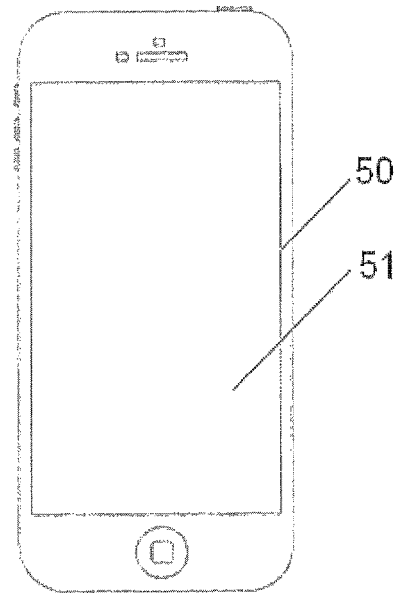
FIG. 6: "Full Screen Application Interface" of the present invention operating system, has not fixed status bar.
Figure 39:
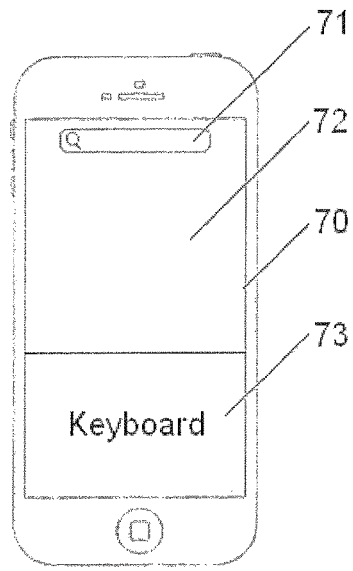
FIG. 39: Search interface of iOS®

Apple®'s iOS® operating system's graphical user interface comprises a Lock Screen Interface, a Home Screen Interface, a Search Screen Interface, an Application Interface, a Notification Center Interface, and a Control Center Interface.

iOS®'s Home Screen Interface 20, as shown in FIG. 2. Home Screen Interface 20 has three sections. There is a fixed status bar 21, on the top of Home Screen 20. The status bar 21 displays the system status. There is a fixed Dock bar 23 on the bottom of Home Screen 20. The Dock bar 23 has several of the most common of application icons 26. There is a desktop 22 in the middle of the Home Screen. On the desktop 22, there are various kinds of application icons 25. Desktop Instruction 24 indicate the current desktop.

iOS®'s Search Screen Interface 70, as shown in FIG. 39. Search Interface 70 has three sections. There is a search bar 71, on the top of Search Interface 70. There is a keyboard area 73 on the bottom of Search Interface 70. There is a Blank area 72 in the middle of Search Screen 70. There also is a fixed Dock bar 23 on the bottom of Search Screen 70, when keyboard 73 is minimized.

iOS®'s Application Interface 40, as shown in FIG. 4. Application Interface 40 has two sections. There is a fixed status bar 41 on the top of Application Interface 40. Below the status bar 41, there is application display area 42. FIG. 5 is an example of FIG. 4. In FIG. 5, there is a status bar 43, which is a sample of fixed status bar 41 on the Application Interface.

In iOS®, the basic operation steps of opening an application, is clicking the most common of application icons 26 in the Dock bar; or sliding on desktop 22, choosing a desktop and then clicking an application icon 25; or searching an application or file in Screen Interface 70, then clicking the corresponding application; or Double-clicking Home Button 16, tuning out the Multi-task interface, then choosing an application in the Multi-task interface; or clicking an application from the Notification Center Interface. The above-described operation steps of opening an application are all entered in the Application Interface 40 which has a fixed status bar 41.

Google®'s Android® operating system's graphical user interface comprises a Lock Screen Interface, a Home Screen Interface, an Application Interface, a Notification Center Interface, a Control Center Interface.

Figure 3:
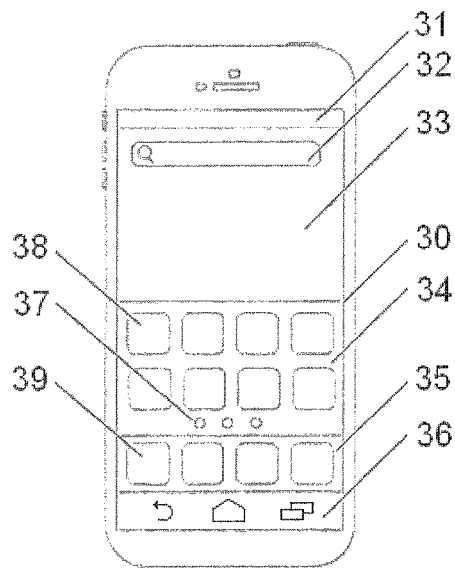
FIG. 3: Schematic diagram of Android® home screen.

Android®'s Home Screen Interface 30, as shown in FIG. 3. Home Screen Interface 30 has five sections. There is a fixed status bar 31 on the top of Home Screen 30. Android®'s desktop is divided into two halves. Upper half desktop 33 usually shows the date, time, weather and other real-time information. There is a Google® search bar 32, in the Upper half desktop 33. A user can slide left or right on Upper half desktop 33, opening half screen display Widgets, such as a calendar. Lower half desktop 34 has application icons 38, and Desktop Instruction 37. Below the desktop, is Dock bar 35, with several of the most common of application icons 39. There is a Menu Bar 36 on the bottom of Home Screen Interface 30, it has three menu options. Some Android® mobile phones do not have a bottom Menu Bar 36. In 38 or 39, the Android® system has a desktop icon, clicking the desktop icon will show a screen interface like iOS®'s Home Screen Interface.

Android®'s Application Interface 40 is similar to iOS®, all have a fixed status bar 41.

In Android®, the basic operation steps of opening an application are similar to iOS®. In many places, in order to circumvent the patents of iOS®, there are some little difference between interface setting and operation settings. These operations are more complicated and not as intuitive as iOS®. There are more operation steps of opening an application than in iOS®.

The present invention operating system's graphical user interface comprises a "Home Screen Interface", a "Global Application Icons Interface", a "Full Screen Application Interface", a "File Browser Interface", and a "Multi-Task Interface".

Figure 8:
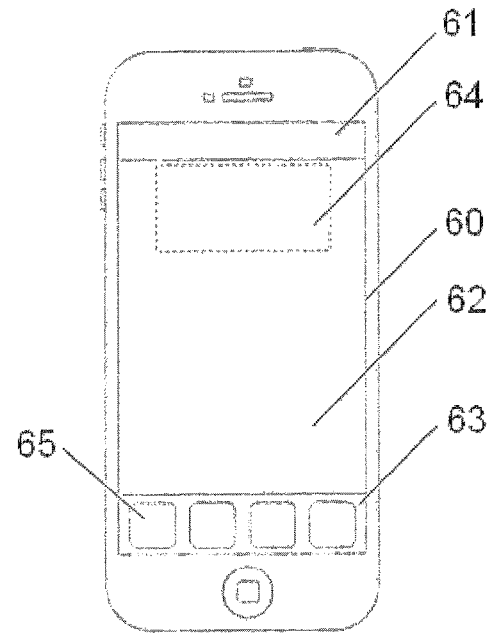
FIG. 8: Schematic diagram of the present invention operating system's home screen.

The present invention operating system's Home Screen 60, as shown in FIG. 8. Home Screen Interface 60 has three sections. There is a status bar 61, on the top of Home Screen 60. There is a Dock bar 63, on the bottom of Home Screen 60. Dock bar 63 has several of the most common of application icons 65. There is a desktop 62, in the middle of Home Screen 60. The operating system's desktop 62 of the present invention has two major differences with the iOS® and Android®'s desktop. The first difference is that the present invention operating system's desktop 62 does not display any application icon in default; or only display application icon which a user can customize in a stable manner on desktop 62. The second difference is that the present invention operating system's desktop 62, only has one desktop page; iOS®'s desktop 22 and Android®'s desktop 33 & 34, all have plurality desktop pages.

There is a Real-time information display area 64 on the desktop 62, display date, time, weather, etc.

In the mobile electronic device, since the screen of the mobile device is usually relatively small, using screen space more efficiently is one of the main performance advantages of the mobile operating system. In iOS® and Android®'s desktop, an application icon's position is fixed. Although a user can drag and move an application icon to another desktop, another position or folder, but after the user configures the icon, the position is still fixed. Whether users need to use the application or not, the application icon is always displayed on there. Not only is this a waste of valuable screen space, but also greatly affects the appearance of the home screen. If application icons become more numerous, the home screen will look crowded, messy, cramped, and the entire screen looks much smaller on visual effects. When a user needs to use an application, other application icons that do not need to be used seriously interfere with the users eyes, increasing the time of users to find and open the needed application's icon.

The present invention operating system has a "Smart Dynamic Icon" function. The system detects applications of different statuses, and if an application status fits the system and user settings, this application's icon is automatically displayed on Home Screen; if an application status does not fit the system and user setting, this application's icon is automatically removed from Home Screen (except the application icon is on the Dock Bar).

The "Smart Dynamic Icon" function is achieved through the "Application Management Unit". The "Application Management Unit" comprises an "Application Status Detection Unit", an "Application Icon Management Unit", an "Application Opening Unit", and an "Application Install and Delete Unit".

The "Application Status Detection Unit" detects in real time all application statuses. The application status comprises 'running' 'shutdown'. The 'running' status includes a foreground process, where the user can see program running interface, and a background process wherein the user cannot see the program running interface. The application status comprises an "Update Status" and a "Non-Update Status". The "Update Status" includes, but is not limited to version updates, content updates, message updates, notification updates, reminder updates, task updates, event updates. The "Update Status" can also be called a "Trigger Status" or an "Active Status". The "Non-Update Status" can also be called a "Non-Trigger Status" or a "Non-Active Status". The 'task updates' means a user instruction-carry-out situation, such as 'user music finished playing', 'user file download finished' or 'video download finished'.

The "Application Icon Management Unit" manages all application icons, manages which application icons are displayed or not displayed, on which desktop they are displayed, the display position on the desktop, the display size, the display time, the display form, and the display sound. The "Application Opening Unit" is in charge of opening and running applications. The "Application Install and Delete Unit" is in charge of installing and uninstalling applications.

In default, the present invention operating system's Home Screen 60, does not display any application icon.

When the "Application Status Detection Unit" detects that an application status is "Update Status", the "Application Icon Management Unit" automatically displays this application's icon on the desktop 62 of the home screen 60. When a user click on this application's icon, the "Application Opening Unit" opens and runs this application, thus this application's update content is employed by the user, and then this application status becomes "Non-Update Status". After this application's status changes from "Update Status" to "Non-Update Status", the "Application Icon Management Unit" automatically removes this application icon from desktop 62 of the home screen 60.

When the "Application Icon Management Unit" automatically displays an application icon on the desktop 62 of the home screen 60, the user can choose to temporarily ignore it. After the user executes ignore instructions, the "Application Icon Management Unit" automatically removes this application icon from the desktop 62 of the home screen 60.

Figure 10:
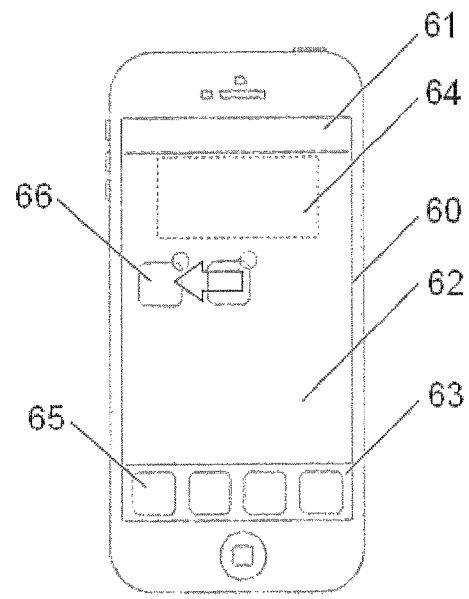
FIG. 10: Slide on application icon, remove this application icon from home screen.

The user's ignore instructions can be sliding left or sliding right from the "Update Status" application icon, as shown in FIG. 10. The user's ignore instructions can also be: clicking on the home button.

When the "Application Icon Management Unit" auto displays an application icon on the desktop 62 of the home screen 60, except for click the icon to open this application; a user can also slide downward or slide upward from the "Update Status" application icon, and directly read the update content, such as new notifications, new messages, and so on. After a user slides downward or slides upward and reads the update content, this application's status changes from "Update Status" to "Non-Update Status", then the "Application Icon Management Unit" automatically removes this application icon from desktop 62 of the home screen 60.

When the "Application Status Detection Unit" detects an application status is "Update Status", the present invention operating system directly automatically display the application's update content on the desktop 62 of the home screen 60. The automatically displayed application update content automatically disappears after a setting time, or disappears after a user clicks and reads; or disappears when a slides left or slides right from the update content; or remains on the desktop until the contents' corresponding task is completed.

This actually make the system Notification Center display and operate in the middle of the desktop; providing more ergonomic finger operation for the user, much smaller finger moving distance and range of movement, and more comfortable finger operation, which is also more efficient and which saves power. iOS® and Android®'s Notification Center, need users to use their fingers to slide from the top of the screen, a user's finger moving operation is very uncomfortable, the moving distance is much farther, thus providing low efficiency, taking more operate time, and that means a waste battery time. iOS® and Android®'s Notification Center also causes easy operation mistakes with slide updating the application's content.

Figure 40:
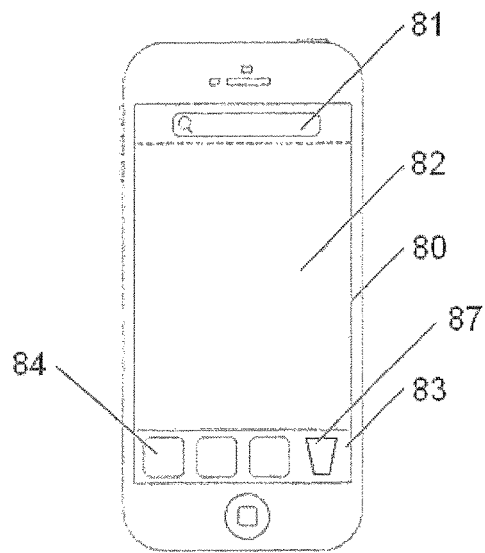
FIG. 40: "Global Application Icons Interface" of the present invention operating system.

All "Application Status Detection Unit" detects "Non-Update Status" applications, their icons are not displayed on the home screen. All "Non-Update Status" application icons, are displayed on the "Global Application Icons Interface" 80, as shown in FIG. 40.

The design principle of the present invention operating system is to think of what the user wants, to do as the user wishes. When a user wants use or needs to use an application, this application's icon immediately appears in front of user. Even when a user wants to use or needs to use an application, the system intelligently and automatically opens this application, there is no need to click on an icon to open an application. When user does not need an application, this application's icon automatically does not display on the home screen, is automatically removed from the home screen, is automatically hidden, automatically disappears. When a user needs an application, it immediately appears; when a user does not needs an icon, it immediately disappears, so the user is not to be disturbed. Come as you hope, and gone as you wish, the present invention operating system follows your mind, and acts your wish.

Home screens have no application icon, or only have a few "Update Status" application icons, thus are more cleaner, more beautiful, more magnificent. Home screens seem glorious, tidy, spacious. The entire screen looks bigger than the screen size of iOS® and Android®, because there are not so many icons that cover it, home screens do have more space for a user. Many users like to use a photo of themselves, or a family photo, or a favorite photo, as a desktop background photo, if no icons cover these photos, they looks more beautiful.

Figure 9:
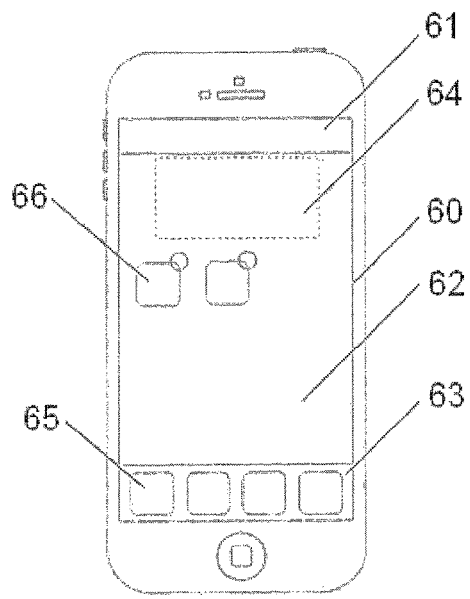
FIG. 9: Present invention application icon automatic appear on home screen, according to application status.

When all applications status are "Non-Update Status", home screen 60 shown in FIG. 8, has a desktop 62 without any application icon existing. When some applications statuses are "Update Status", home screen 60 shown in FIG. 9, has a desktop 62 with a few "Update Status" application that appear. The desktop 62 will display as many icons as there are "Update Status" applications. If there is one "Update Status" application, one icon will be displayed; if there are three "Update Status" applications, three icons will be displayed. FIG. 9 shows a sample of two displayed "Update Status" application icons.

The above-mentioned "Smart Dynamic Icon", applies to all applications icons, except the application icon on Dock Bar. The application's icon in the Dock Bar, is fixed, no matter if it is "Update Status" or not.

If an application's status is "Update Status", the system default setting is for its icon to be displayed on the home screen. The user can independently customize each application, when its status is "Update Status", to display or not display its icon on the home screen. This avoids some malicious applications, in order to improve user usage, when a lot of updating status are deliberately designed and continue appear on home screen, harassing the user.

The user can also customize each application's each kind of update status, setting different dynamic icon policies for different kinds of update statuses. For example, an application has four kinds of update statuses: A, B, C, and D. The user can customize only for the A kind and B kind update statuses, for this application icon to automatically be displayed on home screen; for the C kind and D kind update statuses, this application icon is not displayed on home screen. The user can also customize for each kind of update status, different update content sources, different update content targets, to display or not display its icon on the home screen. For example, if a 'Mail' application inbox has a new email, its icon is displayed on the home screen; if a 'Mail' application junk box has a new email, its icon is not displayed on the home screen; if a 'Mail' application has a new email from a customized sender, its icon is displayed on the home screen; if it is not from a customized sender, its icon is not displayed on the home screen; if a 'Mail' application has a new email to a customized addressee, its icon is displayed on the home screen, otherwise it is not displayed.

Some social networking applications, because there are many Update Statuses, need classification set the trigger status. Such as Facebook®, Twitter®, iMessage®, Skype®, WhatsApp®, Google Voice®, Snapchat®, Line®, Weibo®, Wechat® and so on. The user can set for only specific contacts' new messages or friends' status updates, to automatically display the application's icon on the home screen. Other contact' new messages or friends status update, do not display this social application's icon on the home screen.

The user can also customize each application, no matter whether its status is "Update Status" or "Non-Update Status", the application's icon can always be displayed on the home screen.

Figure 11:
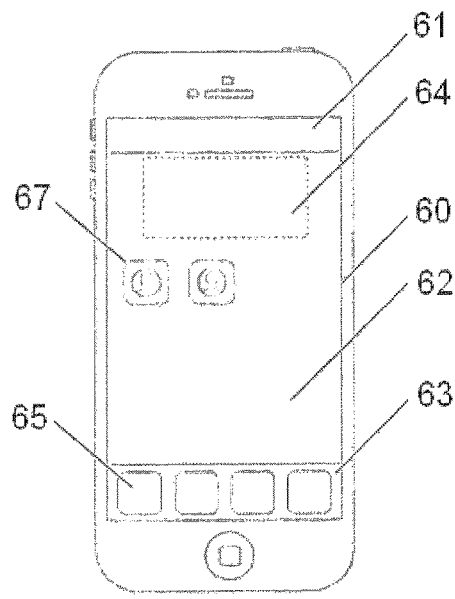
FIG. 11: Home screen has important contacts application icon.

The present invention operating system comprises an "important contacts application" 67. The "important contacts application" integrates all information of a user's one or several most important contacts at one place. The head portrait of the user's important contacts is the icon of the "important contacts application". As show in FIG. 11, the icon of the "important contacts application" 67, can automatically be displayed on Home Screen 60; the system default can or a user's customized contact can also always be fixedly displayed on the Home Screen 60.

Figure 12:
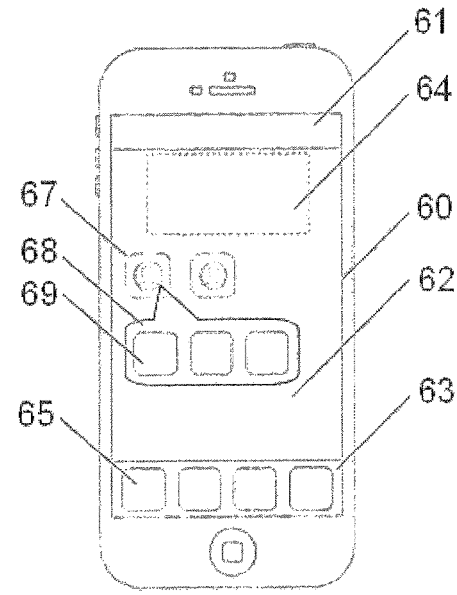
FIG. 12: Important contacts application operating schematic diagram.

A sample application of the "Important contacts application" 67 is shown in FIG. 12. Clicking on the icon of the "important contacts application" 67, open all sub-options 69 related to this important contacts, these sub-options 69 are put in a sub-option box 68. Sub-options 69 can also be called a sub-menus, sub-option box 68 can also be called sub-menu box. Of course, the sub-option box 68 is not necessary, there can also only be a sub-options 69 without a sub-option box 68.

These sub-options, are other applications, such as 'Phone', 'Message', 'FaceTime', 'Mail', 'Facebook', 'Twitter', 'Weibo', 'Wechat', and so on. The number of sub-options 69 is arbitrary, the three shown in FIG. 12 is only a sample. The user clicks on the important contact's head portrait, then chooses to make a telephone call, or video call, or FaceTime®, or send email, without inputting a phone number, or finding these contacts in the contacts address book. It is very convenient, when e-mailing it is no longer needed to enter the contact's email; When using a variety of other social networking applications, it also not needed to find the contacts in those applications.

The "important contacts application" 67, can be combined with the background photo of desktop 62. That is, the person of the desktop photo, is the important contacts. For example, a user sets someone's picture as the background photo of desktop 62; the user sets the background picture to correspond to a person in the contacts address book. If the background picture contains one person it corresponds to one person in the contacts address book; if the background picture contains several people, it corresponds to several people in contacts address book. The system can also automatically associate the people in background picture to the people in contacts address book through a Face Recognition function. When there is incoming calls, messages or emails of an important contact that was set to background picture, a special floating icon will automatically appear on desktop 62. The special floating icon can be similar to icon 69 in FIG. 12. In order to distinguish it from normal application icons, the floating icon can be of a different style, a different form, a different size, a different color, to remind the user that it is from a background photo contact. Users can also set the important contacts' personal update status on social networking sites, to be automatically displayed in real-time on the background photo of desktop 62.

Figure 18:
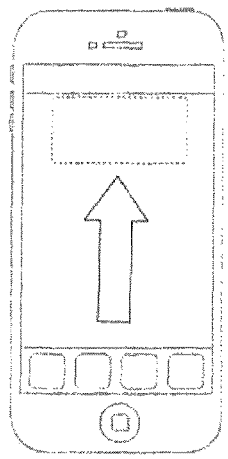
FIG. 18: Slide from down to up on the background desktop of the home screen.
Figure 20:
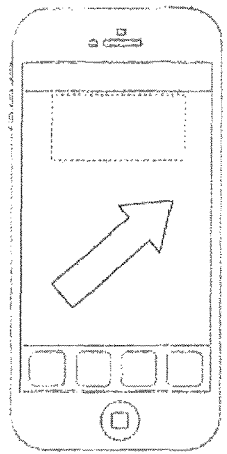
FIG. 20: Slide from lower left to upper right on the background desktop of the home screen.
Figure 21:
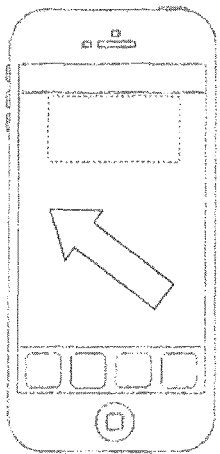
FIG. 21: Slide from lower right to upper left on the background desktop of the home screen.

When the background picture contains only one person, the user direct use of one or more fingers to click (or double-click, or long press, or perform other system setting operations) on the background picture; tunes out the "important contacts application" sub-options 69. Or a user direct slides a special path on the background picture, to directly open special features related to the person in picture. For example, sliding up on the background picture, as shown in FIG. 18, directly calls the person in the picture. For example, sliding from lower right to upper left on the background picture, as shown in FIG. 21, directly sends messages to the person in the picture. For example, sliding from lower left to upper right on the background picture, as shown in FIG. 20, directly FaceTime® videos with the person in the picture.

When the background picture contains several people, such as a family photo, the user can click a family member's head portrait in the background picture to open the family member's sub-options 69. Or the user directly slides along a special path from a family member's head portrait to directly open special features related to the family member.

The "important contacts application" allows a user quick contact with the most frequently used contacts, to reduce the time of the user to respectively find and open different applications. When the icon of "important contacts application" is also the background picture of the desktop, the user interface is more beautiful, the user experience is more natural and attractive, it is more convenient and efficient.

Users can also set up a dynamic background photo for automatic switching between several different background pictures, the user can setup the switching time.

FIG. 13 is an example of a home screen 60 of the present invention operating system's graphical user interface.

In this example, there is a status bar 61 on the top of the home screen 60. In the status bar 61, there is contained a communication signal indication button 61a, Flight Status indication button 61b, WiFi Status indication button 61c, Anti-interference indication button 61d, Bluetooth status indication button 61e, Battery status indication button 61f, and so on. FIG. 13 is only an example; status bar 61 can contain other various system statuses, such as mobile phone muted indication button, phone volume indication button, phone shake status indication button, and so on.

Here is a major different between the present invention operating system's status bar 61, and iOS®'s status bar 21 or Android®'s status bar 31. The items in iOS®'s status bar 21 and Android®'s status bar 31 are only displayed and cannot change the setting. The items in the present invention operating system's status bar 61 can directly change the setting. For example, as shown in FIG. 13, a user can click or long press an indication button to directly setup this indication function, such as clicking or long pressing the Flight Status indication button 61b provides for setting up the Flight Status; for example, clicking 61b, directly open the flight status, and clicking again, closes the flight status.

In status bar 61, different colors means each item of indication status is 'On Status' (open status) or 'Off Status' (close status). Such as a gray color means closed status, other colors mean open status. For example, in FIG. 13, a user can click or long press the WiFi Status indication button 61c for direct setup of the WiFi. Such as clicking 61c, opens or closes WiFi; or the user chooses to connect the WiFi name in an opened submenu.

Different color and different flashings of a signal, indication icon on the status bar, 61 illustrate the strength of the communication signal. For example, a signal indication such as a communication signal indication, a WiFi signal indication, a Bluetooth signal indication etc; use different colors and different flashings to illustrate the strength of the communication signal.

The communication signal indication button 61a, it can be shown in FIG. 13, can also be the traditional little vertical bars from low to high, or direct displaying of the name of telecommunication companies, such as AT&T®, Verizon®, etc. Communication signal indication 61a, uses a green or blue display to illustrate that the signal is strong; a yellow or a yellow flashing display to illustrate that the signal is ordinary; a red or a red flashing display to illustrate that the signal is weak, reminding users that it is better to not make a call; reminding the user to change a location or place, to make a call when the signal is strong. It is very important for user's health, because when the signal is weak, the radiation will be relatively large. Especially when the signal is weak, a user's received calls are easily dropped. With red or red flashing reminder, the user will take the initiative to avoid the call, when the signal is weak; this greatly reduces the possibility of the disconnected phone calls issue, reduces the possibility of consumer dissatisfaction or returns, greatly improves customer satisfaction, and avoids the possibility of quality events such as the 'Apple® Antenna Issue'.

Since finger can be used for the status bar 61 of the present invention to easily and quickly setup, the height of status bar 61 is much higher than the height of iOS®'s status bar 21 and Android®'s status bar 31. Normally it is two or more times higher than that of the iOS® and Android®. Each indication button in status bar 61 is greater and clearer at a glance. The user can directly click the status bar to quickly setup on the home screen. The system is more easy use, more intuitive, when users quickly setup the general options; it is faster and more convenient. It does not like the iOS® and Android®, one needs a slide operation to open the control center or control panel bar, and then clicks to setup.

In the present invention operating system, the user can use two fingers to click status bar 61, to directly open the 'Setting' application.

In the example of FIG. 13, most of the display area in the middle of the home screen 60, is the desktop 62. There is a static or a dynamic background picture on the desktop 62. On the top of the desktop 62, there is a real-time information display area 64, to display time, the date, the weather, etc. Of course the present invention system can have or not have a real-time information display area 64; the time, the date, and the weather can be displayed on the status bar 61.

In the "Smart Dynamic Icon", as described above, there are no icons on desktop 62 at first; the 'Mail' application, the 'iMessage' application 66, and the 'important contacts' application 67, are not displayed on the home screen at first. When the 'Mail' application has a new email, it changes to "Update Status", the icon of the 'Mail' application will automatically be displayed on the home screen, as shown in the example of FIG. 13, the 'Mail' application has eight new emails. When the 'iMessage' application has new messages, it changes to "Update Status", the icon of the 'iMessage' application will be automatically displayed on home screen, as shown in the example of FIG. 13, the 'iMessage' application has six new messages. When the 'important contacts' application has a new status, it changes to "Update Status", the icon of the 'important contacts' application will be automatically displayed on the home screen, as the example of FIG. 13 shows the important contacts application has two missed calls, three new messages, and one new email.

In the example of FIG. 13, there is Dock bar 63 on the bottom of the home screen 60, and in the Dock bar 63, there are the several most commonly used application icons 65. In the example of FIG. 13, the most commonly used applications are 'Phone', 'Voice Assistant', 'Photos', 'Camera'. The user can customize the number and the specific application on dock 63. The 'important contacts' application 67 can also be put in the dock 63, except it is put on desktop 62.

The present invention operating system's dock bar is similar to the iOS®'s dock bar. Of course, the present invention operating system may not include a dock bar. Because of the application icon "Smart Dynamic Icon" technology, the desktop 62 has enough space for put the most commonly used applications 65 on the desktop 62. So the present invention operating system's home screen 60, only comprises two sections: status bar 61 and desktop 62. The desktop 62 will have a larger space and be more beautiful. The present invention operating system can also not include a status bar 61, and the entire home screen 60 is the desktop 62. Indication buttons on original status bar can be surfaced displayed on desktop 62, so the desktop 62 fills the entire screen 15.

The present invention operating system comprises a "Quick Slide Assistant". A system detecting user can use one or more fingers for touch action and slide path on the touchscreen, through a touch sensor on the device. The system directly opens this touch action and slide path corresponding application, the unique corresponding application is setup by the system and the user.

The present invention operating system comprises "User Touch Path Identification Unit", and "User Touch Path Mode Library". "User Touch Path Identification Unit" detect and identification user touch path and slide path on touchscreen, through touch sensor. The "User Touch Path Mode Library" comprises a series of specific touch and slide path modes. When the "User Touch Path Identification Unit" is detected and identifies a user touch and slide path on the touchscreen, and compares this touch and slide path with a "User Touch Path Mode Library", it directly opens this touch and slide path corresponding application, through the "Application Opening Unit". It is not needed to find and click the icon of this application.

The user can do various slide operations on home screen 60, directly opening the corresponding application's "Full Screen Application Interface" 50, with no need to find and click the icon of this application. iOS® system currently does not have this feature. Android® system, as shown in FIG. 3, can slide left or right, on the upper half desktop 33, opening a half screen display Widgets, other applications cannot do such an operation.

The present invention operating system has difference features and characteristics compared to iOS® and Android®:

The first difference is it can do various slide operations on the home screen 60, not limited to slide left or right. The present invention operating system can slide on the home screen, as show in FIG. 14 to FIG. 38.

The second difference is the direct opening application "Full Screen Application Interface" 50; not half screen Widgets; not application interface 40 which has a fixed status bar 41, as shown in FIG. 4.

The third difference is one slide operation default opening only one application, which is more easier for users to remember. Android® system continues sliding, a lot of Widgets appears; user do not remember how many times they need to slide to open a Widget, it's not easy.

The fourth difference is also the most important difference is, the present invention operating system will open different applications according to different slide path areas, different slide path starting point positions, different slide path directions, different slide path shaped and formed. iOS® and Android® do not recognize the slide parameters, such as a starting point, a pass area, a direction, a shape, a form, and so on.

The fifth difference is, for each different slide path, opening different applications according to different numbers of fingers.

As shown in FIG. 14 and FIG. 15, sliding on 'real-time information display area' 64 on the desktop 62, opens applications related to time, date, and weather. For example, a one finger slide as shown FIG. 14, opens Full Screen 'Weather' application, which does not have a status bar. For example, a one finger slide as shown FIG. 15, opens a Full Screen 'Calendar' application, which does not have a status bar. A two of more fingers click on the 'real-time information display area' 64, opens a Full Screen 'Clock' application.

Figure 19:
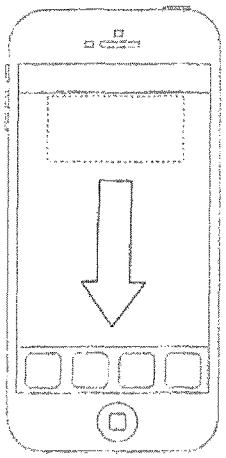
FIG. 19: Slide from up to down on the background desktop of the home screen.
Figure 22:
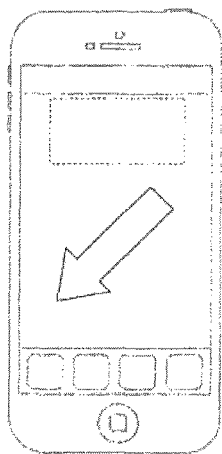
FIG. 22: Slide from upper right to lower left on the background desktop of the home screen.
Figure 23:
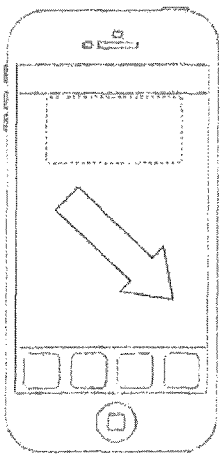
FIG. 23: Slide from upper left to lower right on the background desktop of the home screen.
Figure 24:
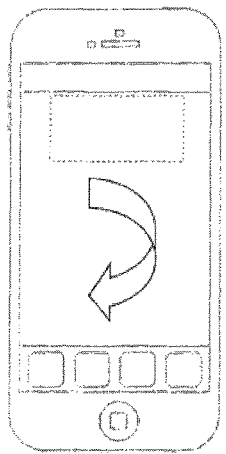
FIG. 24: Clockwise from up to down slide, on the background desktop of the home screen.
Figure 25:
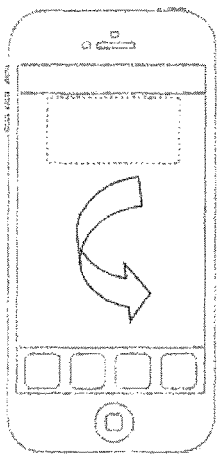
FIG. 25: Counterclockwise from up to down slide, on the background desktop of the home screen.
Figure 26:
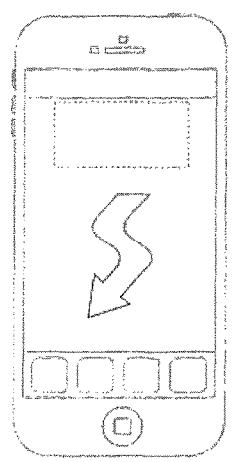
FIG. 26: "S" shape slide from up to down, on the background desktop of the home screen.

As shown in FIG. 16 to FIG. 26, a user can slide along various paths, on the blank space of the desktop 62. FIG. 16 to FIG. 23, shows a straight line slide along an Eight-direction on the blank space of the desktop 62. For example, FIG. 16 shows a slide from right to left; FIG. 17 shows a slide from left to right; FIG. 18 shows a slide from down to up; FIG. 19 shows a slide from up to down; FIG. 20 shows a slide from lower left to upper right; FIG. 21 shows a slide from lower right to upper left; FIG. 22 shows a slide from upper right to lower left; FIG. 23 shows a slide from upper left to lower right. FIG. 24 and FIG. 25 shows a slide in a semicircle, or a curve, or an arc, on the blank space of the desktop 62. FIG. 24 shows a slide along a clockwise arc from up to down; FIG. 25 shows a slide along a counter-clockwise arc from up to down. FIG. 26 shows a slide in an "S" shape from up to down on the desktop 62.

Figure 32:
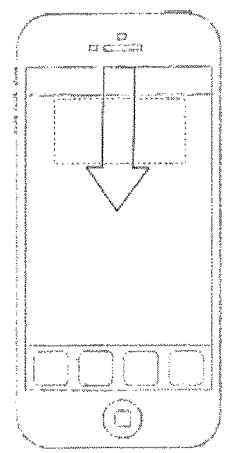
FIG. 32: Slide from the top of home screen, slide from up to down.
Figure 33:
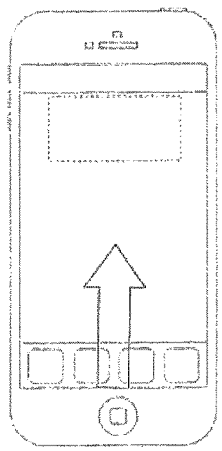
FIG. 33: Slide from the bottom of home screen, slide from down to up.

Except for the samples in FIG. 16 to FIG. 26, the user can also slide along other various kinds of straight lines, broken lines, curve lines, arc lines, circles, triangles, rectangles, and all kinds of regular shapes; a user can also slide along all kinds of regular symbols, such as letter symbols, character symbols, number symbols, mathematical symbols, plus symbol, a checkmark symbol, a cross symbol, a greater than sign symbol, a less than sign symbol. In each slide operation in FIG. 16 to FIG. 26, and in each regular shape slide, regular symbols slide, such as letter symbols, number symbols, a user all can slide using one finger, or two fingers, or three fingers, or four fingers; and multi-fingers can also have different operations of fingers together and fingers apart. FIG. 28 to FIG. 31 show examples of a multi-fingers operation of FIG. 16. Of course, in FIG. 17 to FIG. 26, and in any kind of other slide path, all can be performed with multi-fingers operations like FIG. 28 to FIG. 31. FIG. 32 shows a slide up to down, from the top of the home screen 60. FIG. 33 shows a slide down to up, from the bottom of the home screen 60. In iOS® 7, FIG. 32 open the Notification Center; FIG. 33 open the Control Center.

Table 1 lists a sample of the "User Touch Path Mode Library", and the default Features of the present invention operating system.

TBD in Table 1, means To Be Decided, or To Be Defined.

TABLE 1

| Slide | One finger | Two fingers | Three fingers | Four fingers |
|---|---|---|---|---|
| Click | Open 'important contacts' App | Open Setting Center | Open Multi-task interface | TBD |
| Double-click | Change Background Photo | Open Game Center | Open Multi-task interface | TBD |
| FIG. 14 | Open 'Weather' App | Open 'Clock' App | TBD | TBD |
| FIG. 15 | Open 'Calendar' App | Open China Calendar | TBD | TBD |
| FIG. 16 | Open 'Browser' App | Open 'Map' App | Open 'AirDrop' App | TBD |
| FIG. 17 | Open "Global Application Icons Interface" | Open Multi-task | Open "File Browser Interface" | TBD |
| FIG. 18 | Open 'Phone' App | Change Background | TBD | TBD |
| FIG. 19 | Open 'Photos' App | Change Background | TBD | TBD |
| FIG. 20 | Open 'FaceTime | Open 'AirPlay' App | TBD | TBD |
| FIG. 21 | Open 'Messages' | Open 'AirDrop' App | TBD | TBD |
| FIG. 22 | Open 'Settings' | Open Compass | TBD | TBD |
| FIG. 23 | Open 'Calculator' App | Open 'Reminders' | TBD | TBD |
| FIG. 24 | Open Game Center | Open a Game | Open a Game | TBD |
| FIG. 25 "c" shape | Open 'Contacts' | Open a contacts | Open a contacts | TBD |
| FIG. 26 "s" shape | Open 'Notes' App | Open 'Drawing' App | TBD | TBD |
| "a" shape | Open App Store | TBD | TBD | TBD |
| "g" shape | Open Game Center | Open a Game | Open a Game | TBD |
| "m" shape | Open Music App | Open Music Store | TBD | TBD |
| "r" shape | Open 'Reminders' App | Open Remote App | TBD | TBD |
| "u" shape | Open iTunes U App | TBD | TBD | TBD |
| "v" shape | Open Videos App | Open iMovie App | TBD | TBD |
| "p" shape | Open 'Pages' App | TBD | TBD | TBD |
| "n" shape | Open 'Numbers' App | Open Newsstand | TBD | TBD |
| Rectangle | Open 'Keynote' App | TBD | TBD | TBD |
| Circle | Open 'Earth' App | TBD | TBD | TBD |
| Triangle | Open 'Settings' | TBD | TBD | TBD |

"User Touch Path Mode Library" contains any kind of simple or complex touch action and slide path, Table 1 is just a preferred embodiment of "User Touch Path Mode Library", but is not to limit the present invention.

And any kind of regular shape and regular symbols, which not listed in Table 1, can also setup the corresponding features. For example, one finger slide "✓" symbol opens 'Calculator' application; one finger slide '2' symbol, directly call to someone; one finger slide '3' symbol, directly call to another person. A user can also slide "b" shape, "d" shape, "e" shape, "h" shape, "q" shape, "w" shape, "z" shape, "L" shape, "<" shape, ">" shape, "6" shape, "7" shape, "8" shape, "9" shape, and so on. Each regular shape and regular symbols opens a corresponding application.

Slide paths in Table 1 open "Full Screen Application Interface", which have no fixed status bar. Of course, slide paths in Table 1 can open traditional application interfaces which have fixed status bar. All default features of slide paths in Table 1 can be changed, a user can customize all items in Table 1.

The features of direct slide open an application called "Quick Slide Assistant", can also be called a "Smart Slide".

Figure 27:
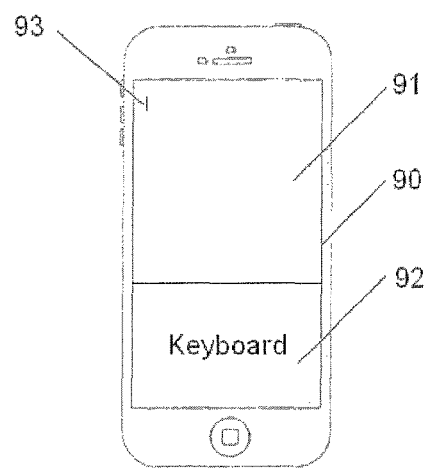
FIG. 27: Notes application interface of the present invention.
Figure 28:
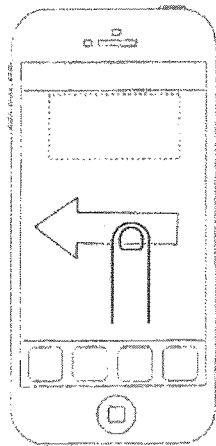
FIG. 28: Schematic diagram of one finger slide on the home screen.
Figure 29:
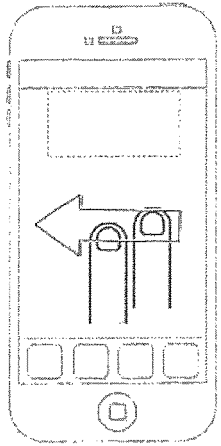
FIG. 29: Schematic diagram of two fingers slide on the home screen.
Figure 30:
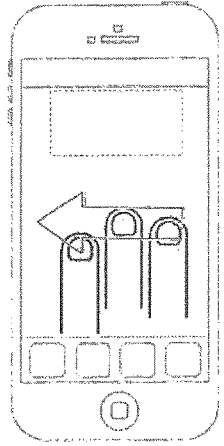
FIG. 30: Schematic diagram of three fingers slide on the home screen.
Figure 31:
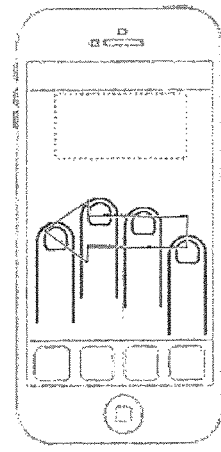
FIG. 31: Schematic diagram of four fingers slide on the home screen.

The present invention operating system comprises a 'Notes' application. The 'Notes' application interface is shown in FIG. 27, comprising 'Notes' application interface 90, text area 91, keyboard area 92, cursor 93. After a user finishes input content, long presses the blank space or two fingers double-clicks the blank space, there will appear the related application icons for a user to choose.

When users want to write something, or have sudden inspiration, users just want to write it immediately. Users do not know and do not care to write it in Notes, Reminders, Calendar, Mail, Blog, Twitter®, Pages, or Word. In iOS® and Android®, a user first needs to find these application icons, then clicks the icon to open the application. But, a user may already forget the sudden inspiration in the finding process; or a user may already have lost the mood to write, because of the complicated find an application's icon with one by one slide screen desktop, or folder by folder clicking.

'Notes' application of the present invention operating system, as shown in FIG. 26. Sliding an "S" shape on the home screen, it is similar writing, directly enters 'Notes' application interface 90. In 'Notes' application interface 90, there is nothing else, only the blank text area 91, a user can input content from the cursor 93 immediately. After user finishes inputting content, long pressing the blank space or two fingers double-clicking the blank space, causes the appearance of related application icons for the user to choose from; such as Notes, Reminders, Calendar, Mail, Twitter®, iMessage®, Pages, and so on. When a user clicks these applications icons and enters the corresponding application, the system automatically copies the content that user just input in the text area 91 and automatically pastes it to the corresponding application. For example, after a user finishes input, a user chooses to click the 'Mail' icon, enters the 'Mail' application, and the system automatically copies the content that the user just input, and automatic pastes into a new email. For example, after a user finishes input, a user chooses to click the 'Twitter' icon, without entering the 'Twitter' application, the system automatically sends the content that the user just input, as a Twitter. The same, if the user chooses to click a 'Reminders' icon, after he finishes input; without entering the 'Reminders' application, the system automatically adds the user inputted content to Reminders.

Figure 34:
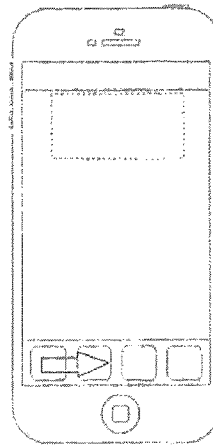
FIG. 34: Slide on the icons on the bottom of home screen, slide from left to right.
Figure 35:
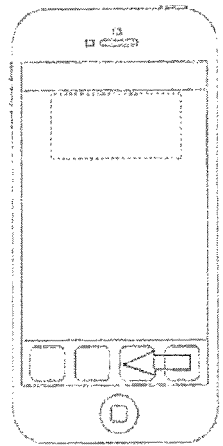
FIG. 35: Slide on the icons on the bottom of home screen, slide from right to left.

In the present invention operating system, sliding on the application icon on the dock bar, opens a related application, relate to the starting point icon, as shown in FIG. 34 and FIG. 35. FIG. 34 shows a slide from left to right, FIG. 35 shows a slide from right to left. Also a user can slide from down to up from the dock, as shown in FIG. 33.

Figure 36:
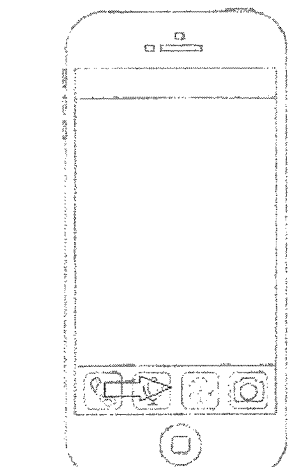
FIG. 36: Slide from left to right, on the "Phone" icon.
Figure 37:
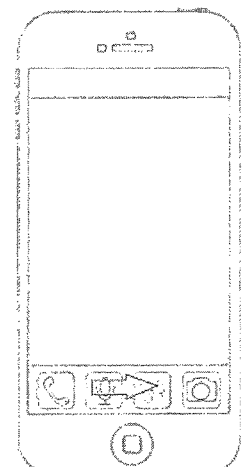
FIG. 37: Slide from left to right, on the "Voice Assistant" icon.
Figure 38:
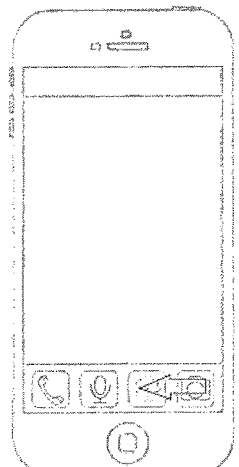
FIG. 38: Slide from right to left, on the "Camera" icon.

FIG. 36, FIG. 37 and FIG. 38, are examples of FIG. 34 and FIG. 35. In FIG. 36, a slide left to right from the 'Phone' icon on the dock bar, opens the 'Contacts' application, which is related to 'Phone' application. In FIG. 38, a slide from right to left from the 'Camera' icon on the dock bar, opens the 'Photos' application, which is related to 'Camera' application.

The present invention operating system comprises a "Quick Voice Assistant" achieving the function of voice opening applications, this function can be achieve without connecting to the network.

The system records a user's speaking voice of application name, through microphone on the device. Then, the system compares the recoded voice with an "application name voice library", and directly opens the application which compared result is conform to the recoded voice.

The "Quick Voice Assistant" comprises a voice input unit, an application name voice library, a voice compare unit, a voice text conversion unit. The application name voice library comprises all voices of all user installed applications names. The system application name voice library default contains the voices of the system built-in applications names. Each time a user installs a new application, the system downloads this application name's voice from a server, and add it to the application name voice library. Each time a user deletes or uninstalls an application, the system deletes this application name's voice from the application name voice library.

Then the application name voice library always contains corresponding voices of all user installed applications names. The voice input unit of the system, recording the user's speaking voice of application name through a microphone. The application name is usually relatively short, general is one word, or several words. It will not be long sentence. So it is easy to compare with. Then, system through voice compare unit, compare with application name voice library, directly open the compare result conform application.

General users installed tens of applications, few users will install hundreds of applications. Because only need compare with tens of application names voice, most compare with hundreds of application names voice, so the speed and accuracy is very high. "Quick Voice Assistant" can quickly and easily open applications, convenient, intuitive, and cool.

The voices in "Application Name Voice Library" can be download from server each time when user installed a new application. The voices can also download together at one time. For example, when user connect to internet, and when the user equipment network speed is vacant, system detects all user installed applications through "Application Management Unit", then system download all user installed applications name voice from a server together.

The voices in "Application Name Voice Library" do not have to download. The system can list all installed application name in a table, through "Application Management Unit"; then use "Voice Text Conversion Unit" convert all installed application name to voice, and generate the "Application Name Voice Library".

The "Quick Voice Assistant" recording user speaking voice of application name, through "Voice Input Unit". The system can also use "Voice Text Conversion Unit" convert user speaking voice to text name, then compare the converted text name with the application name table, and then directly open the application which compared result conform to the converted text name.

"Quick Voice Assistant" of the present invention operating system have these following advantages compare with iOS®'s Siri® Voice Assistant:

The first advantage is that the Voice Assistant does not need to identify and guess the user's intention.

"Quick Voice Assistant" only have one feature, that is open application. So, when start "Quick Voice Assistant", system knows user need to open an application, no need to guess, it is more accurate.

The second advantage is that the user do not need speak a sentence: "Please open XX application", or "Open the XX application". User just need speak "XX", the application name, so the time required to speak, and the time required to recognition is greatly reduced.

The third advantage also is the most major advantage is that Siri® must connect to a network, but "Quick Voice Assistant" can work without network. First saving the user's network traffic and corresponding cost, then saving the time send to server and feed back from the server.

The fourth advantage is that only compare with "Application Name Voice Library", the speed and accuracy greatly exceeds than Siri®. The application immediately opened after user speak its name, user will experience smoothly and surprise.

The "Quick Voice Assistant" is a very good feature in some situations, such as in a car, at home, and on the road.

As shown in FIG. 37, slide left to right from the Siri® icon on the dock bar start "Quick Voice Assistant". The "Quick Voice Assistant" can also has its own icon, its own icon can put on desktop 62, or can put in dock bar 63. The second icon in dock bar in FIG. 13, can be the "Quick Voice Assistant" icon. The user clicks or long pressing the "Quick Voice Assistant" own icon, start "Quick Voice Assistant". The user can also slide on the home screen to open "Quick Voice Assistant"; such as FIG. 18, slide down to up start the "Quick Voice Assistant".

Or, user can one finger long press on the blank space of the home screen, directly starting "Quick Voice Assistant". That is the user can long press on the desktop background wherein at the press place does not have an icon, to open "Quick Voice Assistant" prompt, then the user speaks an application name toward the microphone, the application immediately opens after the user remove his finger. If user said application name is not in "Application Name Voice Library"; the system will prompts user: "You just said program system is not installed, are you need to buy and install it in the App Store?". If user choose Yes, the system will automatically search in App Store, and finish the buy and install process, of course need user confirm and enter the password during the buy process.

The "Quick Voice Assistant" can also be called "Smart Voice Assistant". Table 2 list the advantages that "Quick Voice Assistant" compared with iOS®'s Siri® and Android®'s Google Now®, when the three operating systems open low frequency applications.

TABLE 2

| For low frequency use Apps | | | |
|---|---|---|---|
| | Old slide and click | Siri ®/Google Now ® | Quick Voice Assistant |
| Accuracy | High | Low | High |
| Speed | Middle | Low | High |
| Network | No need | Need | No need |
| Battery | Middle | High | Low |
| consume | Slide find time, screen consume | WiFi, 4G, server, and screen | A little CPU consume |
| Cost | Middle | High | Low |

The "Graphical User Interface" of the present invention operating system comprises a "Global Application Icons Interface" 80. As shown in FIG. 40, the "Global Application Icons Interface" 80 comprises three sections: there is a search bar 81 on the top of the screen; there is an application icons display area 82 in the middle of the screen; there is a dock bar 83 at the bottom of the screen. There is application icon 84 in the dock bar. The "Global Application Icons Interface" 80 can do not have dock bar 83, only have search bar 81 and the application icons display area 82. The "Global Application Icons Interface" 80 can also do not have search bar 81, only have dock bar 83 and application icons display area 82.

The search interface of iOS® as shown in FIG. 39, waste a large blank area 72 in the middle of the screen. In mobile devices, each pixel of display screen is valuable, waste display area is not a good design. The "Global Application Icons Interface" 80 of the present invention operating system, efficiently use the screen.

Figure 41:
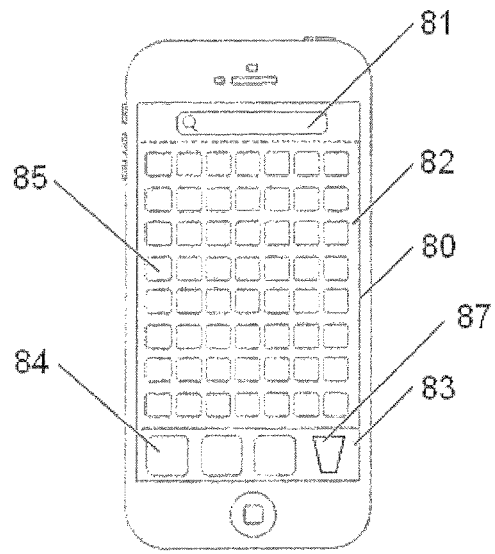
FIG. 41: "Global Application Icons Interface" of the present invention operating system, all icons zoom out display.

FIG. 41 is further illustrate of FIG. 40, the application icons display area 82 display the small application icons. These application icons including all user installed application, except several application icon 65 in the dock bar of the home screen 60, and except several application icon 84 in the dock bar of the "Global Application Icons Interface" 80.

The application icons display area 82 display all installed application icons at one place, allow user to see all applications at a glance. No longer need slide one by one desktops to search an icon like iOS® and Android®. In FIG. 41, user can clear see each application icon. Application icons display area 82 of FIG. 41, automatically adjusts the display size of application icons, according to the quantity of user installed applications. For example, when user install a few applications, the icon display size is relatively big; when user install a lot of applications, the icon display size is relatively small.

Figure 42:
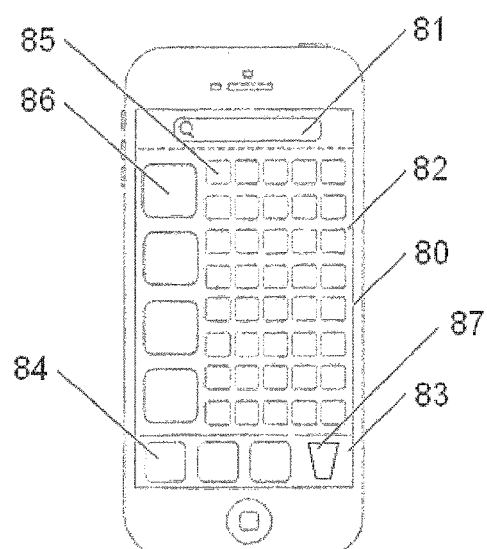
FIG. 42: "Global Application Icons Interface" of the present invention operating system, high use frequency icons zoom in display.

FIG. 42 is another icon array sample of FIG. 40. In application icons display area 82 of FIG. 42, have two kinds of application icon, one is user high frequency use application icon 86, the other is user low frequency use application icon 85. The user high frequency use application icon 86 is relatively big, and the user low frequency use application icon 85 is relatively small. The system can also setup icons displayed by category; and in each category, the top frequency application icon is display big; and other icons is display small behind. Of course, the system can setup the first two or three high frequency use application icons display relatively big.

The "Global Application Icons Interface" 80 comprising a Quick Delete Assistant, user can directly drag an application icon into the trash basket icon 87, then system automatically deletes this application. In iOS® and Android®, user need long press an application icon, then choose to delete an application. The present invention operating system delete application operation is more intuitive, more easy, and more efficient than iOS® and Android®. The user also can long press trash basket icon 87, choose to restore and reinstall a deleted application. Then system will auto search App Store, and reinstall the application. Usually the trash basket icon 87 of Quick Delete Assistant, is put on the dock bar 83 on the bottom of the "Global Application Icons Interface" 80.

Figure 43:
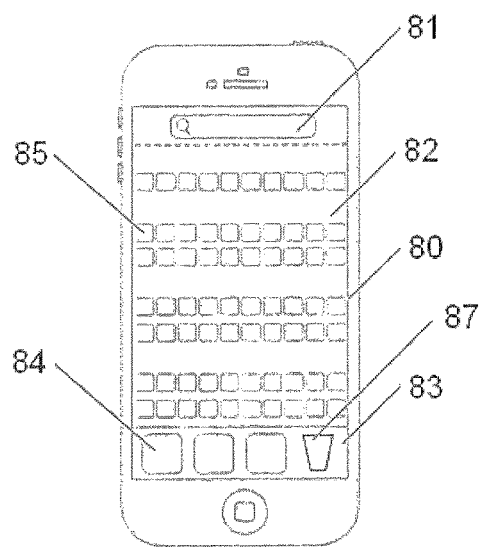
FIG. 43: "Global Application Icons Interface" of the present invention operating system, icons category display.
Figure 44:
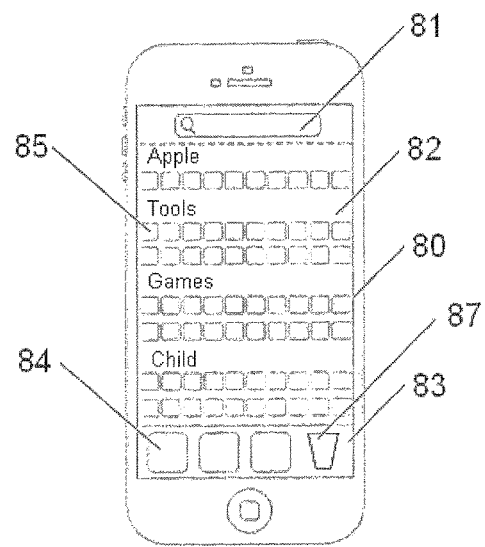
FIG. 44: "Global Application Icons Interface" of the present invention operating system, icons category display sample.

FIG. 43 is another icon array sample of FIG. 40. In application icons display area 82 of FIG. 43, array application icons according to different categories. FIG. 44 is an example of FIG. 43.

The application icons display area 82 can do these following operations. The first operation is user slide from down to up on the application icons display area 82, to display more icons. In fact, for most users, one screen page is enough to put in all user installed application icons. Only a few users who installed hundreds application, need slide to next page. The second operation is double-click on the application icons display area 82 to zoom in the icons that nearby the user finger, and double-click again to zoom out the icons. The third operation is two fingers separate and together, zoom in and zoom out display icon. The fourth operation is user finger continuous slide on the application icons display area 82, realtime zoom in on the icon which user finger touched; when user remove his finger, the system opens the zoom in application.

The "Global Application Icons Interface" 80, user can also input application name in the search bar 81, search an application, and click the application in the search result, then open the application. The user does not need input the whole application name, when user input the first letter, or the first character, system will prompt applications by frequency.

In the "Global Application Icons Interface" 80, all application icons can classification according to their property. The system default array icons according to user use frequency, or according to user use time.

In FIG. 41, array icons from the first row to the last row, in turn reducing the display size of the application icon according to the frequency. Such as the first row icon is bigger than the second row icon; the second row icon is bigger than the third row icon, and so on. The system can also array icons according to classification and frequency, like FIG. 42. The system can also array icons according to categories, like FIG. 43.

The present invention operating system has a low use frequency application delete remind feature, for user to manage their installed application. If an application is not opened by user over a set time, the system will automatically remind a user whether to delete the application. If user choose 'Yes', then the system automatically delete the application. The system will prompt: "XX application, you have XX time not used, do you want to delete it", and have three options: 1 'Yes', 2 'No', 3 'check XX application'. If user choose 'No', system ignore. If user choose 'check XX application', then system open the XX application. For example, system will prompt: "XX game, you have not used for half a year, do you want to delete it?". User can setup the remind time, such as half a year, three months, or one month.

The present invention operating system has a "Smart Gesture" function. The system detects device movement variable value in the three-dimensional space, through sensors in the device. The system detects device surrounding environment variable value, through sensors in the device. The system detects device power supply status, through a circuit in the device. Then the system calculates a user's device use situation, based on a combination of the device movement variable value, the device environment variable value, and the device power supply status. The system executes setting operations if the calculated user's device use situation fits the system and the user setting. The setting operations comprising automatic wake-up, auto unlock, auto sleep, shutdown, power on, directly opening system and user setting application, close current running application, automatic display a category application icons on home screen, and so on.

The environment variable value includes but is not limited to: light, temperature, humidity, sound, geography location, gravity, local time, heart rate, sweat, blood pressure, blood sugar, electrocardiogram, electromyography, brain waves, face recognition.

The device power supply status includes but is not limited to: adapter power supply, internal battery power supply, external battery power supply, battery charging, shutdown, power on, hibernation, sleep, stand by, wake up, supply voltage, supply current.

"Smart Gesture" comprises a "Device Movement Detection Unit", a "Device Environment Detection Unit", a "Device Power Supply Detection Unit", and a "User Use Mode Analyzing Unit";

The "Device Movement Detection Unit" detects the device's movement variable value in the three-dimensional space, through sensors in the device. The "Device Movement Detection Unit" support sensors include but are not limited to: Triaxial gyroscope, Acceleration sensor, Height sensor, Displacement Sensor, Inclinometer sensors, Orientation sensor, Vibration sensor, Proximity sensors, Linear acceleration sensor, Rotation vector sensor.

The "Device Environment Detection Unit" detects device surrounding environment variable value, through sensors in the device. For example, detecting device surrounding light bright and dark variable value through Light sensor. The "Device Environment Detection Unit" support sensors include but are not limited to: Light sensor, Sound sensors, Temperature sensor, Humidity Sensor, Pressure Sensors, Air quality sensor, Wind Sensor, Communication signal sensors, Fingerprint Sensor, Position sensors, GPS, Compass Sensor, Face Recognition Sensor, Smoke Sensors, Ultrasonic sensors, Gas sensors, Pressure sensors, UV Sensor, Magnetic Sensors, Infrared sensors, Ultrasonic sensors, Collision Sensors, Electronic compass sensor, Gravity sensors, Heart rate sensor. Sweat sensors, Blood Pressure Sensor, Glucose sensors, ECG sensors, EMG sensors, Body temperature Sensor, Brain wave sensors, Particle (dust) sensor, Touch Sensor.

The "Device Power Supply Detection Unit" detects device power supply status, through a circuit in the device. The device power supply status include but is not limited to: adapter power supply, internal battery power supply, external battery, power supply, battery charging, shutdown, power on, hibernation, sleep, stand by, wake up, supply voltage, supply current.

Then system calculates user's device use situation based on a combination of the device movement variable value, the device environment variable value, and the device power supply status. The system executes set operations if the calculated user's device use situation fits the system and the user setting. The set operations comprise automatic wake-up, auto unlock, auto sleep, shutdown, power on, directly open system and user setting application, close current running application, automatic display a category application icons on home screen, and so on.

The "User Use Mode" comprises the modes of: a hand held device portrait direction, a hand held device landscape direction, a device placed horizontally on an object, a device in a vertical position (raising), a device placed in a pocket or bag. The "User Use Mode" comprises these five modes and switches between these five modes.

The "User Use Mode Analyzing Unit" calculates three variable values: the device movement variable value in the three-dimensional space, the device surrounding environment variable value, and the device power supply status, and then analyze the user use mode is which kind of user use mode or which kind of switching between these five modes.

The system calculates the "User Use Mode" through "User Use Mode Analyzing Unit", then the system executes an operation corresponding to the calculated "User Use Mode", the system and the user can setup each "User Use Mode" corresponding operation.

Figure 60:
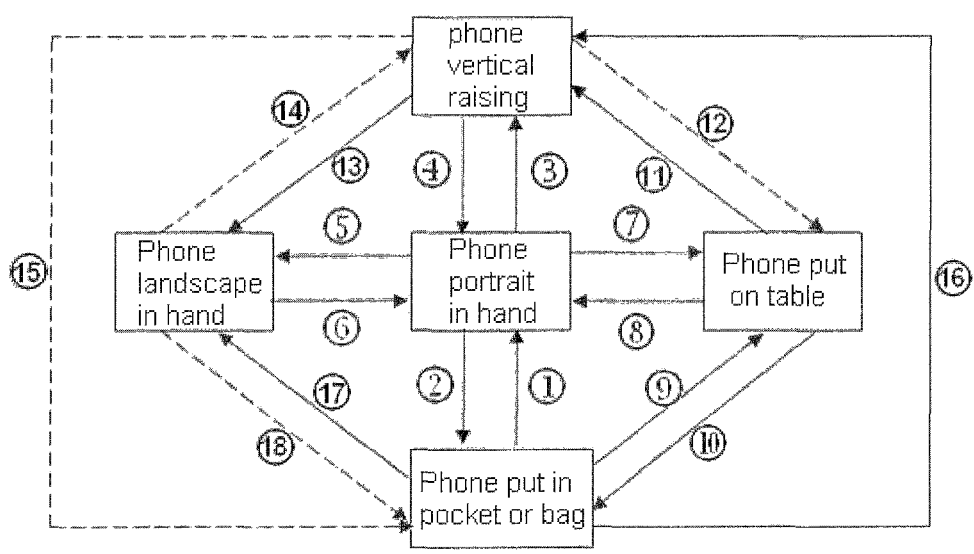
FIG. 60: Five "User Use Mode", and transform between every two "User Use Mode".

FIG. 60 is a sample of mobile phone, listing five common use mode of the mobile phone.

The first "User Use Mode" is mobile phone portrait direction held in hand, usually is 'unlocked' status. Mobile phone is oblique in hand, the screen is upward, the angle between the screen and the horizontal plane is between 0 degrees to 80 degrees.

The second "User Use Mode" is mobile phone landscape direction held in hand, usually is 'unlocked' status. Mobile phone is oblique in hand, the screen is upward, the angle between screen and the horizontal plane is between 0 degrees to 80 degrees.

The third "User Use Mode" is mobile phone horizontally placed on an object, such as tables, stools, chairs, beds, etc. Mobile phone screen is parallel with the horizontal plane, usually in 'sleep' status. In this "User Use Mode", the mobile phone is almost stationary in the three-dimensional space.

The fourth "User Use Mode" is mobile phone put in a pocket or a bag, usually in 'sleep' status. When mobile phone is put in a bag, the screen can be any angle. When mobile phone is put in pocket, the screen angle usually is near vertical angle. In this "User Use Mode", mobile phone has slight and repeated movement in the three-dimensional space. When mobile phone put in bag or pocket, the mobile phone surrounding light usually is dark, which can be detected through the Light sensor.

The fifth "User Use Mode" is mobile phone vertical holding, usually is 'unlocked' status. The angle between screen and the horizontal plane, is near 90 degrees.

The present invention operating system detects whether mobile phone is sleep status, whether mobile phone has movement, and the movement extent; the system detects light intensity around the mobile phone, and the angle between screen and the horizontal plane, then the system can recognition the five "User Use Mode" of the mobile phone.

If mobile phone is sleep status, stationary, and screen is parallel with the horizontal plane, then the mobile phone is in the third "User Use Mode", mobile phone horizontally placed on an object.

If mobile phone is in sleep status, has slight and repeated movement, and surrounding light value is less than a set value, then the mobile phone is the fourth "User Use Mode", mobile phone placed in pocket or bag.

If mobile phone is in 'unlock' status, the angle between screen and the horizontal plane is between 0 degrees to 80 degrees, and the screen is mounting upward, then the mobile phone is the first "User Use Mode", mobile phone portrait direction in hand.

If mobile phone is in 'unlock' status, the angle between screen and the horizontal plane is between 0 degrees to 80 degrees, and the screen is surface upward, then the mobile phone is the second "User Use Mode", mobile phone landscape direction in hand.

If mobile phone is in 'unlock' status, the angle between screen and the horizontal plane is about 90 degrees, then the mobile phone is the fifth "User Use Mode" mobile phone vertical holding.

The present invention operating system detects the changing value of the angle between screen and the horizontal plane, detects the changing value of surroundings light, detects the changing value of movement in the three-dimensional space, and combine with mobile phone status is sleep or wakeup, then the system can recognise the mobile phone is switching between which two states.

As shown in FIG. 60, the present invention operating system can detecting sixteen kinds of switchings between the five "User Use Mode". The solid line means common switchings, the dotted line means rare switchings.

Table 3 lists the system detects sixteen kind of switchings, and the system default features in each kind of switching.

TABLE 3

| Status switch | detecting condition | system default setting |
|---|---|---|
| 1 | surroundings light change bright, and the change value is bigger than a set value; and phone height change higher, and the change value is bigger than a set value | System auto WakeUp, auto Slide Unlook |
| 2 | surroundings light change dark, and the change value is bigger than a set value; and phone height change low, and the change value is bigger than a set value | System auto sleep after a set time |
| 3 | phone height change higher, and the change value is bigger than a set value, the angle between screen and the horizontal plane change big, and the change value is bigger than a set value, usually is bigger than 90 degree or 85 degree | Automatic open 'Camera' application |
| 4 | phone height change low, and the change value is bigger than a set value; the angle between screen and the horizontal plane change small, less than a set value, usually is less than 80 degree | Automatic open 'Photos' or back to home screen |
| 5 | phone height change low, and the change value is less than a set value; and the screen rotation angle is bigger than a set value; usually is bigger than 80 degree | Automatic open 'Video' or display video class icons on home screen |
| 6 | phone height change higher, and the change value is less than a set value and the screen rotation angle is bigger than a set value; usually is bigger than 80 degree | back to home screen, no need press home button |
| 7 | phone height value have changes and the change value is bigger than a set value; and screen is parallel with the horizontal plane | System auto sleep after a set time |
| 8 | phone height value have changes and the change value is bigger than a set value; the angle between screen and the horizontal plane is bigger than a set value, usually is bigger than 30 degree | System auto WakeUp, auto Slide Unlook |
| 9 | surroundings light change bright, and the change value is bigger than a set value; and screen is parallel with the horizontal plane | auto WakeUp then auto sleep |
| 10 | surroundings light change dark, and the change value is bigger than a set value; the angle between screen and the horizontal plane change value is bigger than a set value | auto WakeUp then auto sleep |
| 11 | phone height change higher, and the change value is bigger than a set value, the angle between screen and the horizontal plane change big from parallel, and the change value is bigger than a set value, usually is bigger than 90 degree or 85 degree | Automatic open 'Camera' application |
| 12 | phone height change low, and the change value is bigger than a set value ;and screen is parallel with the horizontal plane | System auto sleep |
| 13 | phone height change low, and the change value is bigger than a set value; and the screen rotation angle is bigger than a set value; usually is bigger than 80 degree | Automatic open 'Video', and play video just taken |
| 14 | phone height change higher, and the change value is bigger than a set value and the screen rotation angle is bigger than a set value; usually is bigger than 80 degree | Automatic open 'Camera' application |
| 15 | surroundings light change dark, and the change value is bigger than a set value; and phone height change low, and the change value is bigger than a set value | System auto sleep after a setting time |
| 16 | surroundings light change bright, and the change value is bigger than a set value; and phone height change higher, and the change value is bigger than a set value; the angle between screen and the horizontal plane change big, and the change value is bigger than a set value, usually is bigger than 90 degree or 85 degree | Automatic open 'Camera' application |

A user can customize each item in the Table 3, customize the default setting operations and functions, for the each kind of "User Use Mode" switching.

The technology in Table 3 can be called "Smart Status Detect", or called "User Use Mode Smart Detect". The "Smart Gesture" can also be called "Smart Move", or "Smart Action".

Figure 45:
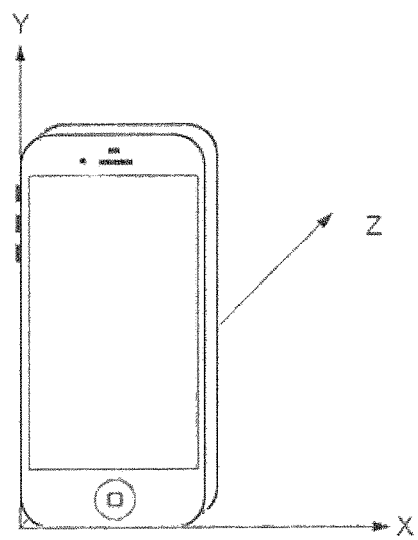
FIG. 45: Three-dimensional coordinates of the mobile phone.
Figure 46:
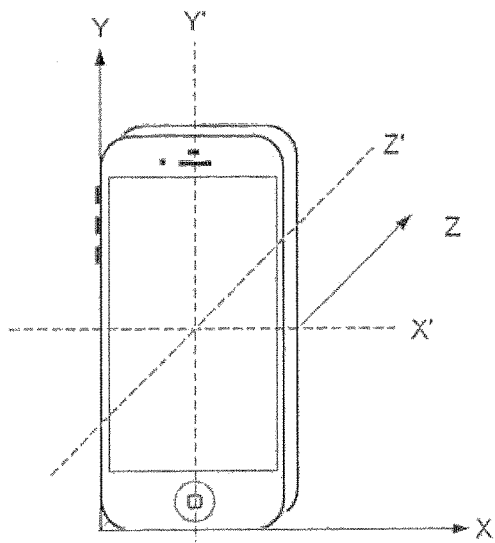
FIG. 46: Two three-dimensional coordinates of the mobile phone.

FIG. 45 is a schematic diagram of mobile phone three-dimensional coordinate axes. Mobile phone width direction is X-axis; Mobile phone length direction is Y-axis; Mobile phone thickness direction is Z-axis. The zero point of three-dimensional coordinate axes in FIG. 45, is on the bottom left corner of the mobile phone. The zero point of second three-dimensional coordinate axes in FIG. 46, is on the center point of the mobile phone.

Figure 47:
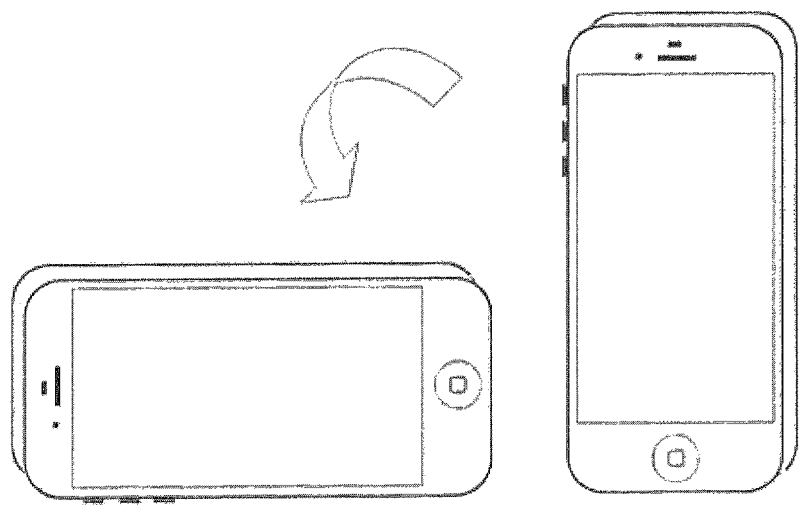
FIG. 47: Mobile phone screen from portrait direction to landscape direction.

As shown in FIG. 47, when user switches "User Use Mode", from portrait direction in hand, to landscape direction in hand, it automatically opens a 'Video' application, or display all user installed video class application icons on the home screen. When user take phone landscape direction in hand, usually want to watch a video. So FIG. 47 gesture open 'Video' application, is very natural and intuitive. The system will open system default video application, or the user set video application. If the user has several common used video applications, the system will automatic display these commonly used video application icons on the home screen for user to choose. When system opens a video application, it will automatically play from the last play history.

"Smart Gesture" in FIG. 47, system detecting the changing value of phone thickness direction (Z-axis direction in FIG. 45) is less than a set range, or less than a setting value; X-axis and Y-axis rotating together, and the changing value is bigger than a set range, or the rotate angle is bigger than a set value. That is system detect thickness direction changing value less than a set value, and device screen rotate angle is bigger than a setting value, the system open video application.

Figure 48:
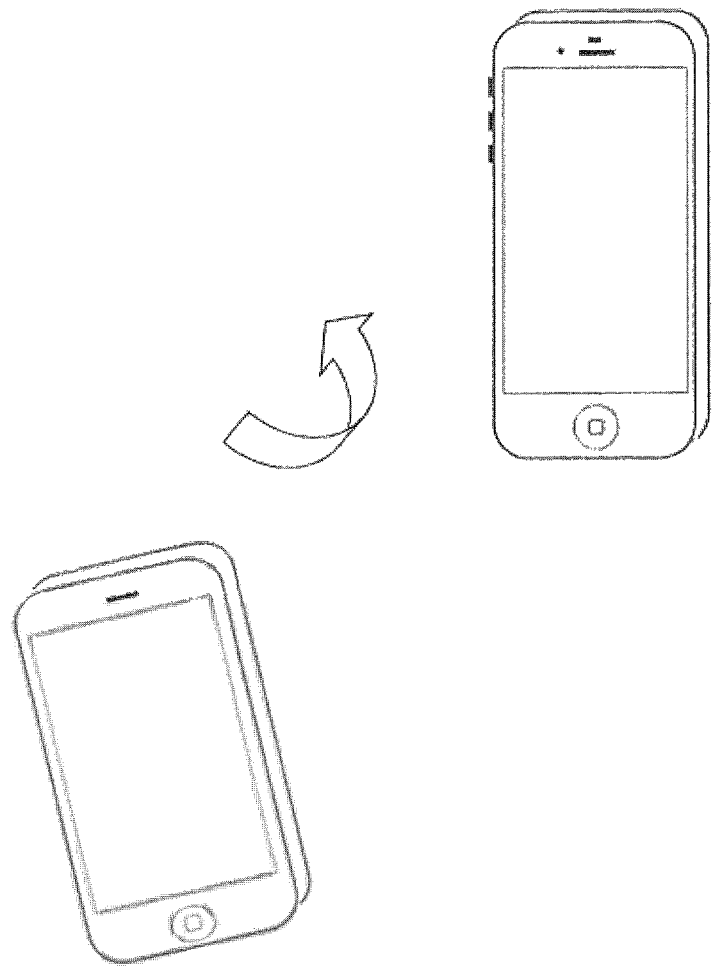
FIG. 48: First naturally hold the phone posture, then raise high and vertical hold the phone, automatic open "Camera" application.

As shown in FIG. 48, when user switching "User Use Mode", from portrait direction in hand to vertical holding, the system automatic open 'Camera' application. The portrait direction in hand use mode, usually is screen in front of the user, the angle between screen and the horizontal plane is between 30 degree to 80 degree.

"Smart Gesture" in FIG. 48, system detects the changing value of phone thickness direction (Z-axis direction in FIG. 45) is bigger than a set range, or bigger than a set value. The system detecting height direction (Y-axis) changing value is bigger than a set range, or bigger than a set value. And system detecting the angle between screen and the horizontal plane, is bigger than a set value, usually is bigger than 90 degree or 85 degree. That is when system detect device height changing value is bigger than a set value, and the angle between screen and the horizontal plane is bigger than a set value, the system automatically open 'Camera' application.

Figure 49:
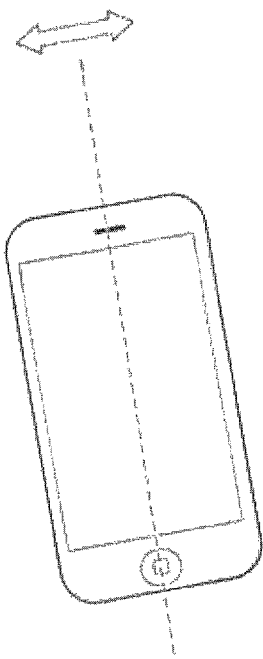
FIG. 49: left and right shaking mobile phone.
Figure 50:
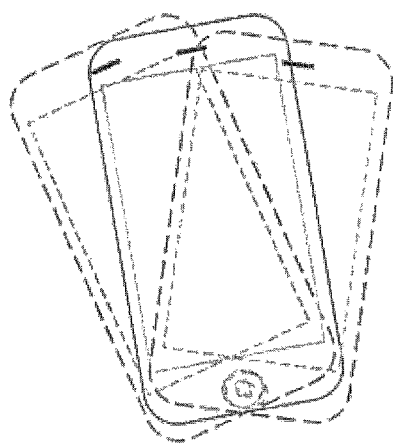
FIG. 50: left and right shaking mobile phone.

As shown in FIG. 49 and FIG. 50, when "User Use Mode" is device portrait direction in hand, if the user shaking mobile phone left and right, the system open the system and the user set application, such as open "Twitter" application.

If the left and right shaking amplitude by the user is little, the system opens "Twitter" application; If the left and right shaking amplitude by the user is big, the system opens "Facebook" application.

Or, if the left and right shaking amplitude by the user is little, open "Wechat" application; If the left and right shaking amplitude by the user is big, open "Weibo" application.

"Smart Gesture" in FIG. 50, the system detecting shaking of the device to the left and right on X'-axis direction in FIG. 46, and take the Y'-axis in FIG. 46 as a center.

Figure 51:
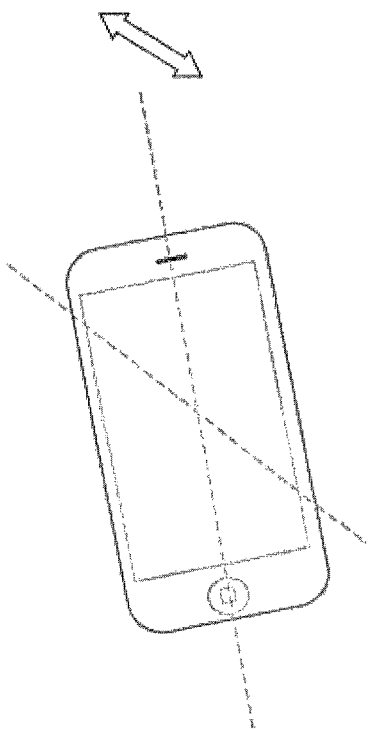
FIG. 51: up and down shaking mobile phone.
Figure 52:
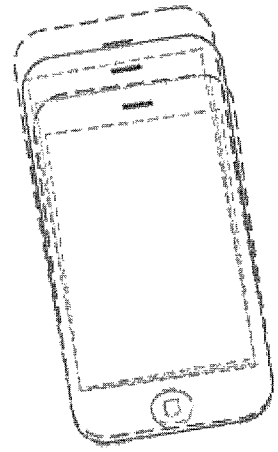
FIG. 52: up and down shaking mobile phone.

As shown in FIG. 51 and FIG. 52, when "User Use Mode" is device portrait direction in hand, shaking the mobile phone up and down, opens the set application, such as open "iMessage" application.

If user up and down shaking amplitude is little, the system opens "iMessage" application; If user up and down shaking amplitude is big, the system open Mail application.

"Smart Gesture" in FIG. 52, the system detects device up and down shaking on Z'-axis direction in FIG. 46, and take the Y'-axis in FIG. 46 as a center.

FIG. 50 and FIG. 52, the system opens the default IM application, user can also setup and open their common use instant social communication application. For example, some users like Twitter®, he can setup the device such that up and down shaking, directly opens "Twitter". For example, other users like Wechat®, he can setup up and down shaking, directly opens "Wechat". Of course, the system can setup up and down shaking mobile phone, automatically displaying all user installed instant social communication application icons on the home screen. For example, display the icons of Facebook®, Twitter®, iMessage®, Mail, Skype®, WhatsApp®, Google Voice®, Snapchat®, Line®, Wechat®, Weibo®, etc, on the home screen.

FIG. 53 to FIG. 56 are mobile phones held sideways by a user, and shaking the mobile phone to open application. FIG. 53 is Vertical and Sideways held mobile phone, left and right shaking. FIG. 54 is Vertical and Sideways held mobile phone, front and behind shaking. FIG. 55 is Horizontal and Sideways held mobile phone, left and right shaking. FIG. 56 is Horizontal and Sideways held mobile phone, up and down shaking. FIG. 53 gesture can set to open compass application. FIG. 54 gesture can set to open Voice Memos application. FIG. 55 gesture can set to open Map application. FIG. 56 gesture can set to open Game Center application.

Gestures in FIG. 47 to FIG. 56, user can setup each gesture corresponding application, or setup automatically display which category of application icons on the home screen, and setup the applications of each category.

Each gesture can do it reverse gesture. The reverse gesture can setup to resume the before status. For example, in FIG. 47, reverse gesture from landscape direction in hand, to portrait direction in hand, the system automatic from video application to home screen, no need press home button. Or the system automatic from video to the application user just run on portrait direction. Of course, the user can also click home button back to home screen. For example, FIG. 48, reverse gesture from 'vertical holding' to 'portrait direction in hand', the system automatic from camera application to photos application, user can immediately enjoy the photos.

FIG. 45 and FIG. 46, user can do any gesture in the three-dimensional space. FIG. 47 to FIG. 56, just a few gesture sample of FIG. 45 and FIG. 46. Any type of gesture in the three-dimensional space, and directly open the correspond application, or automatically display a category icons on the home screen, are within the scope of protection of this present invention. For example, when user take mobile phone forward, and detecting surroundings light is dark, and the light value is less than a set value, the system smart opens flashlight.

Table 4 lists the gestures of FIG. 45 to FIG. 56, and the system default features of each gesture.

TABLE 4

| | left and right shaking | up and down shaking | front and behind shaking |
|---|---|---|---|
| Parallel horizontally Screen upward | WakeUp, check Notification Center | / | WakeUp, check Reminders |
| device portrait direction in hand | Open "Twitter" App | Open iMessage | Open Map App |
| device landscape direction in hand | Open game center Or open iMovie App | Open a game or Garageband | Open a game or open iPhotos |
| device vertical holding | Open 'Photos' App | Open "FaceTime" | Open Camera |
| device vertical and Sideways holding | Open "Siri" or Podcasts | Open compass | Open memo |
| device horizontally and Sideways holding | Open Garageband | Mute function | Open Map App |

Of course, each gesture in Table 4 can open different application according to different move amplitude, different move speed, different move strength, and different move number of times. For example, in FIG. 50, if left and right shaking amplitude is less than 30 degree, the system opens "Twitter"; if left and right shaking amplitude is bigger than 60 degree, the system opens "Facebook". For example, in FIG. 52, if up and down shaking strength is little, the system opens "iMessage"; if up and down shaking strength is big, the system opens Mail. For example, in FIG. 50, if left and right shaking less than three times, the system opens "Snapchat" application. For example, in FIG. 52, if up and down shaking more than three times, the system opens "WhatsApp" application.

The present invention operating system can setup through "Application Icon Management Unit", hide an application icon, then this application icon do not display on anyplace. This application icon is only opened by a user setup specific gesture. It's good for the users who need privacy.

"Smart Gesture", the system opens different application according to different local time, and different location. At night, after a set time, such as after 23:00, by overturning phone and screen downward, the system automatically shut downs; in the morning, after set time, such as 6:00-9:00, by overturning phone and screen upward, the system automatically turns power on; between two set times, such as 9:00-23:00, overturning phone and screen downward, is mute function or close application function.

"Smart Gesture" usually perform on home screen, or on "Global Application Icons Interface". Of course, "Smart Gesture" can also perform on sleep status, or perform on lock screen, or perform on application interface.

When Apple® invent the iPhone®, they invented the slide to unlock feature at the same time. The slide to unlock feature's main purpose is to prevent a mistake touch, mistaken operation, and mistaken call, when the touchscreen mobile phone is put in pocket. Slide to unlock feature also avoid light up mobile phone screen, when mobile phone is put in pocket, while user do not need to use, and waste battery life. All other mobile operating system include Android®, apply the slide to unlock feature, and big companies spent a huge amount of money, and protracted litigation time on the slide to unlock patent. But present mobile operating system, such as iOS® and Android®, their slide to unlock feature, all need the user first take out mobile phone, then click home button, or click power button, then slide on the lock screen, then enter home screen.

The first, user clicks the home button or power button dozens of times, even hundreds of times every day. The home button and the power button are easy to damage. Every day global smart phone users check their mobile phone over 100 billion times, each time save 1 second, will save human 3000 years.

The second, traditional slide to unlock has low efficiency, light up screen time is long, and battery time is short.

The "Smart Gesture" of the present invention operating system, lets sliding to unlock become an extra and unnecessary procedure. The present invention's operating system, when the user takes out the mobile phone from the pocket or bag, or when the user picks up mobile phone from table or bed, the system automatically wakes up, and automatically unlocks. If user does not set a password, system will directly enter the home screen; if the user sets a password, system direct enter the password interface or fingerprint input interface (when user set fingerprint). "Smart Gesture" has the following advantages:

1. User experience more natural, smooth and intuitive
2. Reduce an operate step of click home button or power button; and reduce an operate step of slide to unlock. It has higher efficiency. The home button and power button may have longer life.
3. Reduce screen light up time, and battery time becomes longer.

The present invention operating system also detects device headphone jack status: if headphones have been inserted into the headphone jack, the system automatic open music application or displays music class application icons on the home screen.

The present invention operating system comprising a File Browser application. "File Browser Interface" 100, as shown in FIG. 57, displays all user files on this interface. As shown in FIG. 57, "File Browser Interface" 100, comprising menu bar 101 on the top of the screen, and below menu bar is file name display area 102. On the menu bar 101, left is file, right is sort button. Click sort button, can arrange files according to file name, file size, file type, file date, etc. On the file name display area 102, one by one to display the file name.

FIG. 58 is "File Browser Interface" horizontal display. As shown in FIG. 58, "File Browser Interface" 100, comprising menu bar 101 on the top of the screen, and below menu bar is file name display area 102. The menu bar 101 contains four button: File, Size, Type, Date. The user can choose to arrange files according to file name, file size, file type, and file date. On the file name display area 102, one by one to display the file name.

The user can slide down to up on the "File Browser Interface" 100, view more files. And can also do variety of editing functions. For example, click to open file, slide left or right to delete file, long press to rename file.

"File Browser Interface" 100 can also be called 'Global File Browser Interface', or 'Global File Interface'. In "File Browser Interface" 100, the user can create folder, and the folder can be multilayer.

Figure 59:
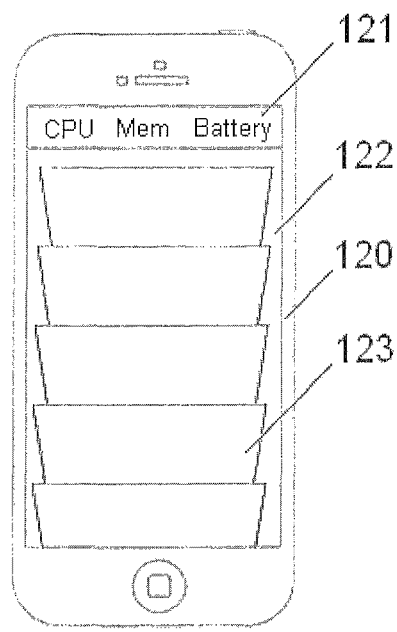
FIG. 59: "Multi-Task Interface" of the present invention operating system.

The present invention operating system comprises a "Multi-Task Interface" 120. As shown in FIG. 59, "Multi-Task Interface" 120 comprising menu bar 121 on the top of the screen, below the menu bar is Multi-Task display area 122, display the running applications. Menu bar 121 have CPU item, Memory item, and Battery item. The user can arranges applications according to CPU use from high to low, or according to Memory use from high to low, or according to Battery use from high to low. As shown in FIG. 59, Multi-Task display area 122, display the running applications, each running application is a card. 123 is a sample of running application card. On "Multi-Task Interface" 120, user can slide down to up to view more applications; user can slide left or right on an application card 123 to completely shut down the running application.

Such "Multi-Task Interface" let user wish to do application process management. Priority delete those not in use, occupy more CPU and Memory Applications. This will greatly reduce application occupy system resources, greatly improve device battery life. This also give pressure to those application developers, let them reduce application systems occupy, to optimize the efficiency of the application. Some malicious applications without user open, the application secretly run in the background. If user find these malicious applications in "Multi-Task Interface" 120, slide to shut down. If these malicious applications automatically appear on "Multi-Task Interface" 120 again, user can completely delete these malicious applications on "Global Application Icons Interface"80.

"Multi-Task Interface" 120 can also be called "Efficacy Multi-Task Interface".

The present invention operating system comprises directly completely close application function. It can be called "Quick Close", or "Quick Completely Close". iOS® and Android® do not have this function. In iOS® and Android®, user click the physical or virtual home button, quit the current running application, but this application is still running at the background, especially iOS® and Android® systems all support multi-tasking now. But when user click home button quit an application, users psychologically think that the application has been shut down, but in fact the application is not closed, is still running. Although Android® provides a key to shut down all the applications, but in most cases, users do not bother to multi-task management interface to operate. It cause lots of applications to run at the same time, consume system resources, especially consume valuable mobile phone battery life, but user does not know.

The present invention operating system provides a close button to user. When user finish use an application, if user wishes for this application to continue running, then user clicks the home button, switches to home screen or other application.

When user finishes using an application, if user wishes to close this application, then the user directly clicks the close button of the present invention.

Figure 7:
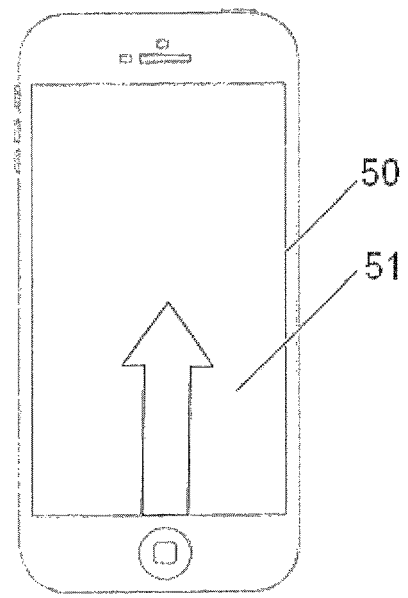
FIG. 7: Slide from down to up from the bottom of application interface, direct completely close this application.

The present invention close button can be slide down to up from the bottom of the screen on the application interface, as shown in FIG. 7, directly completely close this application. In FIG. 7 sample, is slide down to up from the middle bottom of the screen; the present invention can also slide down to up from the edge bottom of the screen, or the present invention can also slide up to down from the middle top of the screen, or the present invention can also slide up to down from the edge top of the screen. The four above-mentioned sliding operations may be a finger, or may be a plurality of fingers.

The present invention's close button can be setup as a virtual button on menu bar 36 of FIG. 3, this virtual button's name is close, this virtual button's shape can be a cross (X). The menu bar can be on the bottom of screen as shown in FIG. 3, can also be on the top of the screen. Or in iOS®'s assistive touch, click the virtual home button, appear a virtual (X) close button.

The present invention close button can also be, long press home button on an application interface, directly completely close this application. Or, double-click home button, directly completely close this application. Or click power button, directly completely close this application.

The present invention close button can also be, on application interlace, rotate mobile phone, screen down, directly completely close this application. In an application's interface, when system detecting device rotate, screen down, and the angle between screen and horizontal plane is less than a setting number, the system directly completely close this application.

When user directly completely close an application, for distinguish with the ordinary click home button to quit an application, the application interface of the present invention operating system have an animation, gradually changes from large to small, then disappears on screen.

The present invention operating system provides a function for fast switching between applications, and quick return to the application running before. It's similar to the "Back" button ("return" button) of TV remote control, that quick switching between two TV Channels. TV users like the "Back" button, and it is one of the most high frequency use button. Similarly, on mobile devices, many times the user needs constantly to switch back and forth between two applications.

But in iOS® and Android®, user needs to click home button back to home screen, slide desktop find the switching application icon, then click the icon; or user need double-click home button (iOS®), or long press home button (Android®), enter their Multi-Task Interface, and choose the switching application icon, then click the icon. This is very troublesome, which is same when the TV user needs to switch TV channels, the TV user needs to find the digital numbers again and press the numbers.

The present invention operating system, user can direct double-clicks home button, it is equivalent to TV "Back" button, directly opens the application running before, fast switching between two applications.

Many times the iPhone®'s user double-clicks the Home button, enter multi-task interface, in fact just hope to switch to the application running before.

The present invention operating system, switching between two applications, reduce a eyes search step, reduce a click icon step, and sometimes also reduce one or more slide step. Greatly improving user efficiency, speed, and also improve the battery life. And this kind of fast switching between two applications, like fast switching between two TV channels, giving users a smooth, seamless transition of feeling. In mobile internet period, user experience is king, user experience is one of most important key of product.

In the present invention operating system, by clicking the home button the user is taken back to the home screen; double-click home button is fast switching between two applications; long pressing home button directly and completely closes the application. It is very intuitive and easy to use.

On any interface of the present invention operating system, the user can use three or more fingers click or double-click screen, enter "Multi-Task Interface" in FIG. 59. Or, on any interface, user can use three or more fingers slide together on the screen, enter "Multi-Task Interface" in FIG. 59. Three or more fingers means multi, open the "Multi-Task Interface", is very intuitive.

The present invention operating system can also set long press home button, enter "Multi-Task Interface".

The present invention operating system can also quick adjust screen brightness. The user presses the home button and the volume buttons at the same time to quickly adjust screen brightness. Press the home button and the volume+ button at the same time, to increase the brightness of the screen; press the home button and the volume−button at the same time, to reduce the brightness of the screen.

The present invention operating system can also set sideways held mobile as shown in FIG. 53, FIG. 54, FIG. 55, and FIG. 56, and shaking the mobile phone is Mute function, the same as pressing the mute button.

In the present invention's operating system long pressing at each application's icon, opens the Control Options of this application. In the Control Options, user can setup the options of "Smart Dynamic Icon", "Quick Slide Assistant", "Quick Voice Assistant", "Quick Delete Assistant", "Smart Gesture", and so on.

The present invention operating system, "Smart Dynamic Icon" collocation to the "Global Application Icons Interface" and the "Quick Voice Assistant", lets the home screen of the user become clean, fresh, and beautiful.

The present invention operating system, high frequency applications directly open by "Smart Gesture", or automatically appear on the home screen by "Smart Dynamic Icon"; middle frequency applications directly open by "Quick Slide Assistant"; low frequency applications open by "Quick Voice Assistant" and "Global Application Icons Interface". The present invention operating system, comprehensive entered the Post Icon Age, it is the next-generation mobile operating system.

Traditional mobile operating system, such as iOS® and Android®, are still static icon operating methods, and need to slide desktop by desktop, or click folder by folder, to searching for an icon. The present invention operating system will reduce the time of searching for an application and the time of opening an application, at least double the amount of time.

On home screen or any other interface, if the system is detecting only an application is "Update Status", the system can directly enter this application's "Full Screen Application Interface".

Specific layout, mode, operation, according to the idea of this present invention, are within the scope of protection of this present invention. Replacement and transposition of the abovementioned examples' location, quantity, type etc; are within the scope of protection of this present invention.

In addition to mobile phones, the present invention operating system can also be used in any other electronic device, such as Tablet PCs, notebook computers, desktop computers, AIO (All In One) computers, Transformers computers, music players, Watches, wristbands, glasses, games, remote controls, TVs, and so on. And make the appropriate changes according to the characteristics of other devices. For example Tablet PC is "User Use Mode" change from 'landscape direction in hand' to 'vertical holding', automatically opens "Camera" application.

The term 'home screen' of the present invention has the same meaning of 'main screen', 'home desktop', 'main desktop', 'default screen', and 'default desktop'.

The term "Global Application Icons Interface" can also be called "Global Icons Interface", or "Panoramic Application Icons Interface", or "Panoramic Icons Interface".

The description drawing examples of the present invention, do not have application name under the application icons, it is just for ease of description. In practical applications, the present invention operating system can have the application name under the application icons, or can also have no application name under the application icons.

In the specification of the present invention, a lot of iOS®'s application names were used for easy understanding, in practical applications, these can be Androidas corresponding functions application names, or other companies application names.

Those skilled in this field can understand: the above description is only a preferred embodiment of the present invention, but not to limit the present invention. For the skilled technicians, they can modify the technical solutions, or replacement some technical features. Any modification within the spirit and principles of this present invention, are within the scope of protection of this present invention.

The invention claimed is:

1. A mobile operating system comprises an Application Management Unit, a Device Movement Detection Unit, a Device Environment Detection Unit, a Device Power Supply Detection Unit, a User Use Mode Analyzing Unit, a Graphical User Interface, a Quick Voice Assistant, and a Quick Slide Assistant in which;
   the system detects an application of a different status, if the application status fits the system and user setting, an application icon is automatically displayed on a home screen; if the application status does not fit the system and user setting, the application icon is automatically removed from the home screen;
   the system detects device movement of a variable value in the three-dimensional space through sensors in the device; the system detects a device environment variable value through sensors in the device; the system detects a device power supply status through a circuit in the device; then the system calculates a device use situation of the user, based on combining the device movement variable value, the device environment variable value, and the device power supply status, wherein
   the system executes setting operations if the calculated device use situation of the user fits the system and the user setting; and wherein the setting operations comprise automatic wake-up, auto unlock, auto sleep, shutdown, power on, a direct opening system and user setting applications, closing current running applications, and automatic displaying category application icons on the home screen;
   the system provides an input for a the voice of a user, to speak a name of an application through a microphone in the device; the system compares the spoken name with an Application Name Voice Library, which includes all user installed application name voices; then the system directly opens the corresponding application which matches with the user voice;
   the system detects the slide path of one or more fingers of the user on a touchscreen, the system directly opens the system and user setting, and the unique application corresponds to the slide path.

2. The mobile operating system according to claim 1, wherein the system further comprises Smart Dynamic Icon, the function of the Smart Dynamic icon is achieved through
   the Application Management Unit, wherein the Application Management Unit comprises an Application Status Detection Unit, an Application Icon Management Unit, an Application Opening Unit, and an Application Install and Delete Unit; in which
   the Application Management Unit detects all application statuses through the Application Status Detection Unit, the detected application status is in an Update Status or a Non-Update Status condition;
   when the Application Status Detection Unit detects the application status it is in the Update Status condition, and the Application Icon Management Unit auto displays this application icon on the home screen;
   the Application Icon Management Unit manages all application icons, manages whether the application icons are displayed or not displayed, on which desktop they are displayed, the display position on the desktop, the display size, the display time, the display form, and the display sound;
   when the user touches this application icon, the Application Opening Unit opens and runs this application;
   when the Application Status Detection Unit detects the application on the home screen, the status is in the Non-Update Status condition, and the Application Icon Management Unit automatically removes that application icon from the home screen;
   when the user slides left or slides right from the Update Status application icon, ignores the update status, or touches the home button to ignore the update status, the Application Icon Management Unit removes the application icon from the home screen;
   when the user slides downwards or slide upwards from the Updated Status application icon, the updated content is directly read;
   or when the Application Status Detection Unit detects the application, the status is in Update Status condition, and the update content is automatically displayed on the home screen; the update content automatically disappears after a setting time; or disappears after the user touches and reads it; or disappears when sliding left or sliding right from the update content; and wherein
   each user individually customizes the system for each application: if the application icon is automatically displayed on the home screen, when this application status is in the Update Status condition; if the application icon is always displayed on the home screen; if the application icon is automatically displayed on the home screen, for the different update content types, for the different updated content source, and for different update content objects of the Update Status condition.

3. The mobile operating system according to claim 1, wherein the Quick Slide Assistant
   comprises a User Touch Path Identification Unit, and a User Touch Path Mode Library; in which
   the User Touch Path Identification Unit detects and identifies the user touch path and slide path on the touchscreen through a touch sensor;
   the User Touch Path Mode Library comprises a series of specific touch and slide path modes; the User Touch Path Mode Library comprises a single finger or multi-finger touches or double touches; single finger or multi-finger slide straight line, arc line, broken line, circle, triangle, rectangle, symbol; the symbol comprising letter symbols, character symbols, number symbols, mathematical symbols;

when the User Touch Path Identification Unit detects and identifies a user touch and slide path on the touchscreen, compares this touch and slide path with the User Touch Path Mode Library, then directly opens this touch and slide path corresponding application through the Application Opening Unit; wherein the same slide path passes different display content on the screen corresponds to opening different applications; wherein the same slide path having a starting point on a different application icon, corresponds to opening different applications; and wherein the same slide path using a different number of fingers, or placing the fingers together or apart corresponds to opening different applications.

4. The mobile operating system according to claim 1, wherein the Quick Voice Assistant comprises a Voice Input Unit, an Application Name Voice Library, a Voice Compare Unit, and a Voice Text Conversion Unit; in which the Voice Input Unit provides for inputting a voice through a microphone, recording the user's spoken voice of an application name, and using the Voice Compare Unit to compare this recording voice with the Application Name Voice Library, then directly opening the application that its name voice compared result conforms to the user spoken voice;

for the Application Name Voice Library, each time a user installs a new application, this application name's voice is downloaded from a server; or all user installed application name voices are downloaded from a server at one time;

for the Application Name Voice Library, when a user uninstalls an application, the system deletes this application name voice from the Application Name Voice Library; or the application name voice library, through Voice Text Conversion Unit, converts all user installed application name texts to voices; and wherein user long presses at a blank area on the home screen, and the system starts the Quick Voice Assistant.

5. The mobile operating system according to claim 1, wherein the system further comprises a Smart Gesture; and wherein the Smart Gesture comprises the Device Movement Detection Unit, the Device Environment Detection Unit, the Device Power Supply Detection Unit, and the User Use Mode Analyzing Unit; in which the Device Movement Detection Unit detects the device's movement variable value in the three-dimensional space, the movement variable value comprising displacement, angular velocity, speed, acceleration, rotation vector, height, and slope angle;

the Device Environment Detection Unit detects the device's surrounding environment variable value, the environment variable value comprising light, temperature, humidity, sound, geography location, gravity, local time, heart rate, sweat, blood pressure, blood sugar, electrocardiogram, electromyography, brain waves, and face recognition;

the Device Power Supply Detection Unit detects the device's power supply status, the device's power supply status comprising adapter power supply, internal battery power supply, external battery power supply, battery charging, shutdown, power on, hibernation, sleep, stand by, wake up, supply voltage, and supply current;

User Use Mode comprises the modes of: a hand held device portrait direction, a hand held device landscape direction, a device placed horizontally on an object, a device in a vertical position (raising), a device placed in a pocket or hag; the User Use Mode comprises these five modes and switches between these five modes;

the User Use Mode Analyzing Unit calculates three variable values: the device movement variable value in the three-dimensional space, the device surrounding environment variable value, and the device power supply status, and then analyzes the user use mode to determine the user use mode or any switching between the five modes; and the system calculates the User Use Mode through the User Use Mode Analyzing Unit, then the system executes an operation corresponding to the calculated User Use Mode, the system and the user set up each User Use Mode corresponding operation.

6. The mobile operating system according to claim 1, wherein if the system detects a device height variable value with a changing value of zero, a tri-axial angle variable value with a changing value of zero, and a power supply status that is 'sleep' or 'shutdown', then the User Use Mode Analyzing Unit analyzes that the User Use Mode of the device is a 'device placed horizontally on an object'; and if the system detects a device height variable value with a changing value that is less than a set value, a tri-axial angle variable value with a changing value that is greater than zero and less than a set value, a device surrounding light variable value that is less than a set value, and a power supply status that is 'sleep' or 'shutdown', then the User Use Mode Analyzing Unit analyzes that the User Use Mode is a 'device placed in a pocket or bag'; and if the system detects that the angle between the device screen and the horizontal plane, is between two set values; that the angle between device portrait direction (length direction) and the horizontal plane is greater than a set value, and that the power supply status is in the 'unlock' status, then the User Use Mode Analyzing Unit analyzes that the User Use Mode is a 'device in hand held portrait direction'; and if the system detects that the angle between the device screen and the horizontal plane is between two set values, that the angle between the device landscape direction (width direction) and the horizontal plane is greater than a set value, and that the power supply status is in a 'unlock' status, then the User Use Mode Analyzing Unit analyzes that the User Use Mode is a 'device in hand held landscape direction'; and if the system detects that the angle between the device screen and the horizontal plane is greater than a set value, and that the power supply status is in the 'unlock' status, then the User Use Mode Analyzing Unit analyzes that the User Use Mode is a 'device in a vertical (holding) position'; and if the system detects a device height variable value with a changing value that is greater than a set value and at the same time, the device surrounding light variable value is changing to 'brightening', and the changing value is greater than a set value, the system will automatically wake-up, or the system will automatically wake-up together with an automatic unlock slide at the same time; and if the system detects a device height variable value with a changing value that is greater than a set value and at the same time, the device surrounding light variable value is changing to 'darkening', and the changing value is greater than a set value, the system will automatically sleep; and if the system detects a device height variable value with a changing value that is greater than a set value and at the same time, the angle between device screen and the horizontal plane is greater than a set value, the system will automatically open a camera application; and if the system detects a User Use Mode from the 'device in hand held portrait direction' or the 'device in hand held landscape direction', to the 'device placed horizontally on an object', the system will automatic sleep; and if the system detects a User Use Mode from the 'device placed horizontally on an object' to the 'device in hand held portrait direction' or the 'device in hand held landscape direction', the system will automatically wake-up, or the system will automatically wake-up together with an automatic unlock slide at the same time; and if the system detects a User Use Mode from the 'device in hand held portrait direction' to the 'device in hand held landscape direction', the system automatically opens a video application, or displays all installed video class application icons on the home screen.

7. The mobile operating system according to claim 1, wherein when the User Use Mode is a 'device placed horizontally on an object', and the system detects the device is shaking left and right, or forward and backward; the system will automatically wake-up; and when the User Use Mode is a 'device in hand held portrait direction', and the system detects the device is shaking left and right, or up and down, or forward and backward, the system will directly open a corresponding instant messaging (IM) application which is setup by the system and user; and the system opens different applications according to different movement amplitudes, different movement speeds, different movement strengths, and different number of times of movement; and for the same gesture, the system opens different applications according to different local times, and different locations; and at night, after a set time, and overturning the phone and screen downward, the system automatically shut downs; in the morning, after a set time, and overturning phone and screen upward, the system automatically turns power on; between two set times, overturning the phone and screen downwards, is a mute function or closing application function; and when on the home screen and the system detects headphones inserted into the headphone jack, the system automatically opens a music application or displays music class application icons on the home screen.

8. The mobile operating system according to claim 1, wherein the Graphical User Interface comprises a Home Screen, a Global Application Icons Interface, a Full Screen Application Interface, a File Browser Interface, and a Multi-Task Interface; in which the Home Screen comprises three sections: a status bar on the top of the home screen, a dock bar at the bottom of the home screen, a desktop in the middle of the home screen, the desktop has a real-time information display area; and wherein the user touches with two fingers or multiple fingers on the real-time information area to open a 'clock' application; and the user touches with one finger or long presses the instruction icons on the status bar, to directly setup these instruction features; and the user touches the status bar with multiple fingers to open the 'settings' application;

a communication signal indication icon on the status bar has different colors and different flashing to illustrate the strength of the communication signal; a green or blue display illustrates that the signal is strong, a yellow or yellow flashing display illustrates that the signal is ordinary, a red or red flashing display illustrates that the signal is weak;

the Full Screen Application Interface owns all the display area of the entire screen, there is no fixed status bar on the top of screen;

the Global Application Icons Interface comprises three sections: a search bar on the top of the screen, an application icons display area in the middle of screen, a dock bar at the bottom of screen; there is a trash basket icon on the dock bar; the application icons display area shows all application icons except the applications on the dock bar;

the Global Application Icons Interface automatically adjusts the display size of the application icons according to the quantity of user installed applications;

the Global Application Icons Interface arranges application icons according to user use frequency, or arranges application icons according to user open time, or arranges application icons by application type;

the Global Application Icons Interface displays different application icons in different sizes according to user use frequency, user open time, and application type;

for the Global Application Icons Interface, a one finger double touches zooms in and zooms out the display icon; separating or moving together two fingers zooms in and zooms out the display icon;

in the Global Application Icons Interface, when dragging an application icon to the trash basket icon, the system uninstalls this application, and long pressing the trash basket icon is choosing to recover and re-install the deleted applications;

in the Global Application Icons Interface, if an application does not open over a set time, the system auto-reminds the user whether or not to delete this application;

the File Browser Interface comprises a menu bar on the top of screen, and a file display area below the menu bar; the menu bar arranges files according to file name, file size, file type, and file date; wherein on the file display area, the user touches to open a file, slides left or right to delete a file, and long presses to rename a file name;

the Multi-Task Interface comprises a menu bar on the top of the screen, and a running applications display area below the menu bar; running applications display area shows running application cards; the menu bar comprises a CPU item, a Memory item and a Battery item; and wherein on any interface, the use of three or more fingers to touch or double touch opens the Multi-Task Interface; or on any interface, the use of three or more fingers together to slide on the screen to open the Multi-Task Interface.

9. The mobile operating system according to claim 1, wherein the system comprises a direct complete close application function: wherein
- in an interface of an application, using one or more fingers, sliding from down to up from the bottom of the screen, or sliding from up to down from the top of the screen, directly and completely closes this application; or
- in an interface of an application, sliding to open the system menu bar, there is a virtual close button on the menu bar, touching the virtual close button directly and completely closes this application; or
- in an interface of an application, long pressing the home button directly and completely closes this application; or
- in an interface or an application, clicks the power button directly and completely closes this application; or
- in an interface of an application, when the system detects the device is rotating the screen down, and the angle between the screen and horizontal plane is less than a set number, the system directly and completely closes this application; and
- in an interface of an application, double touching the home button directly opens the application that was running before, thereby fast switching between applications; and wherein pressing the home button and volume button at the same time adjusts screen brightness.

10. The mobile operating system according to claim 1, wherein the system comprises an important contacts application integrating all the information of important contacts of a user in one place; wherein
- a head portrait of the important contacts of the user is the icon of the important contacts application; and
- touching the icon of the important contacts application, displays all sub-options related to the important contacts; or
- the important contacts application combines with the background photo of desktop, after the user sets an important contacts photo as a background photo of the desktop, the user click on the background photo with one or more fingers, to directly open sub-options; or
- the user slides along a specific path on the background photo to directly open specific features related to the important contacts in the background photo; the specific features comprises making a phone call, sending a message, leaving a voice message, video calling; and wherein
- the user subscription of important contacts in social networking provides for important contacts social network personal update status to automatically display on the background photo.

* * * * *